United States Patent [19]

Boaz et al.

[11] Patent Number: 5,333,266
[45] Date of Patent: Jul. 26, 1994

[54] METHOD AND APPARATUS FOR MESSAGE HANDLING IN COMPUTER SYSTEMS

[75] Inventors: Wade Boaz, Clifton; Daniel D'Elena, Milford; Michael Lucivero, Emerson, all of N.J.; Sarka Martinez, Boca Raton, Fla.; Ronald J. Salpietra, Novi, Mich.; Olga E. Savastano, Bloomfield; Ronald Soltis, Wayne, both of N.J.

[73] Assignee: International Business Machines Corporation, Armonk, N.Y.

[21] Appl. No.: 858,918

[22] Filed: Mar. 27, 1992

[51] Int. Cl.⁵ ............................................. G06F 13/00
[52] U.S. Cl. ................................................... 395/200
[58] Field of Search ............... 395/200, 700, 600, 650; 370/60, 94.1

[56] References Cited

U.S. PATENT DOCUMENTS

| | | |
|---|---|---|
| 4,791,660 | 12/1988 | Oye et al. |
| 4,794,639 | 12/1988 | Urui et al. |
| 4,805,207 | 2/1989 | McNutt et al. |
| 4,815,121 | 3/1989 | Yoshida |
| 4,829,514 | 5/1989 | Frimmel, Jr. et al. |
| 4,837,798 | 6/1989 | Cohen et al. |
| 4,847,891 | 7/1989 | Kotani |
| 4,901,341 | 2/1990 | Carter et al. |
| 5,121,384 | 6/1992 | Ozeki et al. ........................ 370/60 |
| 5,170,252 | 12/1992 | Gear et al. ........................ 358/181 |

*Primary Examiner*—Robert L. Richardson
*Attorney, Agent, or Firm*—J. E. Hoel; K. A. Seaman

[57] ABSTRACT

An Integrated Messaging System which integrates mail from a plurality of mail servers handling messages of different media types such as text, voice, facsimile, video and image. The IMS maintains the in-basket for all mail systems, eliminating the need to collect each type of mail separately. Any terminal interface, telephone or computer workstation can be used to collect, generate and act upon a message of any media type. Further, from the preferred system, the user can request another file server and its associated terminals to perform messaging services. The system includes a variety traditional E-mail and voice mail functions which can be used for any message. The IMS also includes synchronization means which checks to see whether the mail count in each in-basket is the same to guarantee that the same mail items are in each file server in-basket. An integrated messaging protocol is used to pass information between the file servers. It is designed in a generic manner to allow wide variety of foreign message formats at each of the respected media file server. For the majority of transactions, the protocol is independent of message body format, referencing only the message pointer or header.

36 Claims, 19 Drawing Sheets

FIG. 7
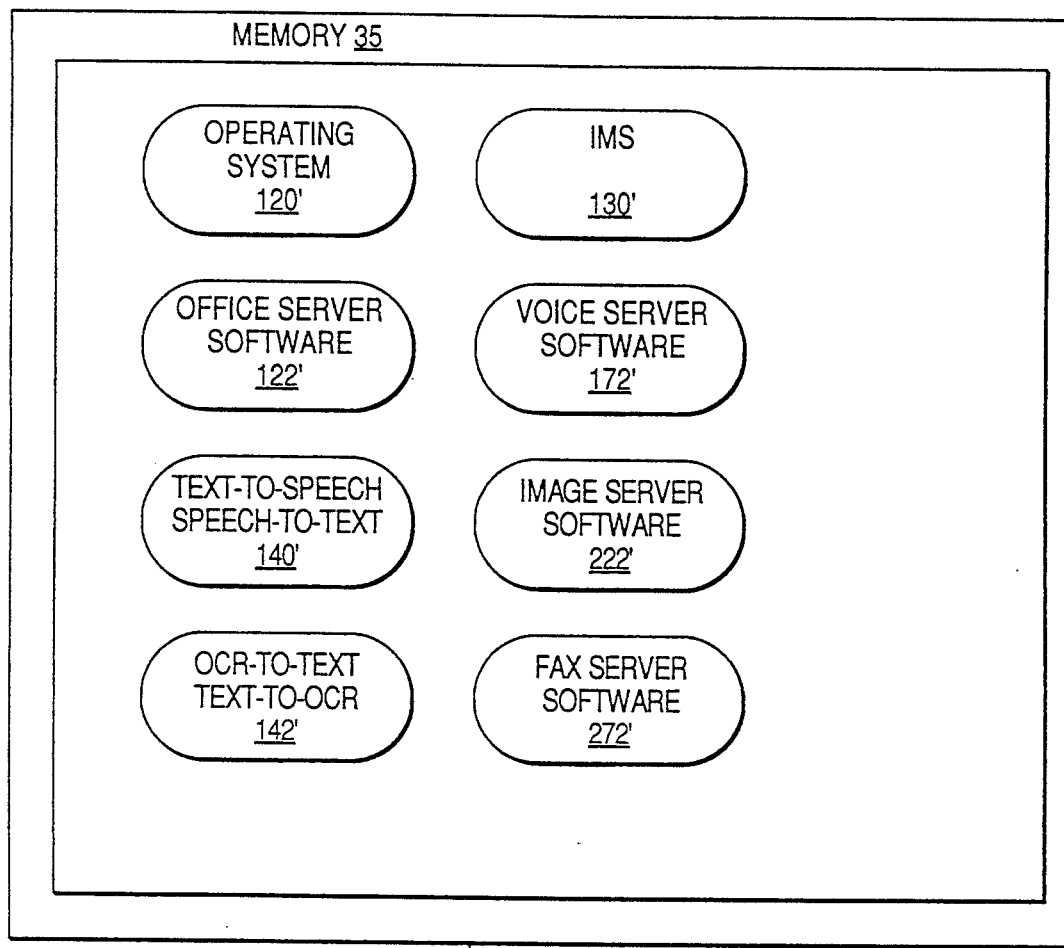
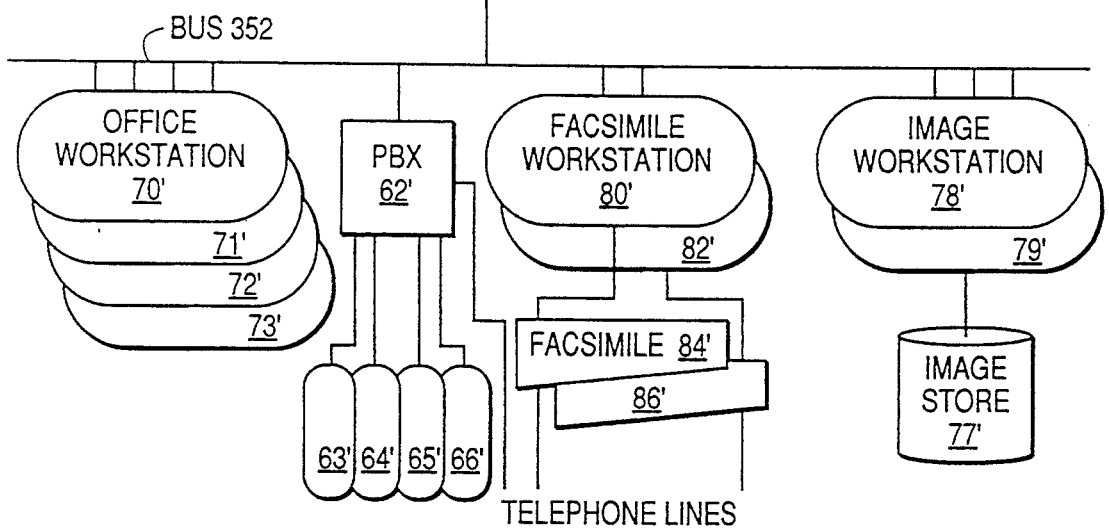

FIG. 9

| (2 BYTES) | (2 BYTES) | (2 BYTES) | (2 BYTES) | (N BYTES) |
|---|---|---|---|---|
| MSG LEN | VERB ID | FLD LEN | FIELD ID | FIELD VALUE |

RECORD (VSUSERID, VSNODE, SESSIONPHONE, RECORDTYPE, VSSEQUENCE)

| MSG LEN | VERB ID | FLD LEN | FLD ID | FIELD VALUE |
|---|---|---|---|---|
| 44 | 33 | 10 | 54 | SOLTIS |
| | | 12 | 52 | VOICENOD |
| | | 8 | 33 | 2885 |
| | | 5 | 25 | 1 |
| | | 5 | 53 | 0 |

RECORDR (VSUSERID, VSNODE, SESSIONPHONE, ERRCODE)

| MSG LEN | VERB ID | FLD LEN | FLD ID | FIELD VALUE |
|---|---|---|---|---|
| 36 | 34 | 10 | 54 | SOLTIS |
| | | 12 | 52 | VOICENOD |
| | | 8 | 33 | 2885 |
| | | 2 | 15 | 0 |

ENDRECORD (VSUSERID, VSNODE, DELETEFLAG, SESSIONPHONE)

| MSG LEN | VERB ID | FLD LEN | FLD ID | FIELD VALUE |
|---|---|---|---|---|
| 35 | 69 | 10 | 54 | SOLTIS |
| | | 12 | 52 | VOICENOD |
| | | 1 | 64 | 1 |
| | | 8 | 33 | 2885 |

ENDRECORDR (VSUSERID, VSNODE, SESSIONPHONE, ERRCODE)

| MSG LEN | VERB ID | FLD LEN | FLD ID | FIELD VALUE |
|---|---|---|---|---|
| 36 | 70 | 10 | 54 | SOLTIS |
| | | 12 | 52 | VOICENOD |
| | | 8 | 33 | 2885 |
| | | 2 | 15 | 0 |

PLAY (VSUSERID, VSNODE, SESSIONPHONE, PLAYACTION, VSSEQUENCE)

| MSG LEN | VERB ID | FLD LEN | FLD ID | FIELD VALUE |
|---|---|---|---|---|
| 43 | 25 | 10 | 54 | SOLTIS |
| | | 12 | 52 | VOICENOD |
| | | 8 | 33 | 2885 |
| | | 1 | 23 | 2885 |
| | | 8 | 53 | 12345678 |

PLAYR (VSUSERID, VSNODE, SESSIONPHONE, ERRCODE, VSSEQUENCE)

| MSG LEN | VERB ID | FLD LEN | FLD ID | FIELD VALUE |
|---|---|---|---|---|
| 44 | 26 | 10 | 54 | SOLTIS |
| | | 12 | 52 | VOICENOD |
| | | 8 | 33 | 2885 |
| | | 2 | 15 | 0 |
| | | 8 | 53 | 12345678 |

PLAYING A MAIL ICON FROM THE IN-BASKET:

DIALING FROM THE PHONE PANEL:

METHOD AND APPARATUS FOR MESSAGE HANDLING IN COMPUTER SYSTEMS

BACKGROUND OF THE INVENTION

This invention relates generally to electronic messaging systems. More particularly, this invention relates to a multimedia messaging system in which message information processed and stored by any of a plurality of interconnected electronic mail systems can be accessed from any system.

Voice mail messaging in a telecommunication system when the caller is unavailable has become nearly ubiquitous. The voice message is recorded and a notification may be given to the called party indicating the presence of a message. Further, it is also common to provide electronic mail systems such as IBM's PROFS TM and OfficeVision/VM TM in which text messages are sent from a sender's computer terminal over a data network to other computer terminals within the network. While these messaging systems have greatly improved the efficiency of today's office environment, access to a terminal or voice mail system is not always possible. Further, as the office environment evolves toward multimedia systems, one will work with a large amount of information, collected from a variety of media types including text, image, video, voice and facsimile. Much of this information need not originate from the local computer terminal. Thus, it would be advantageous if the receiver could receive mail from all of these different media, or at least notification thereof, whether he had access to all or to only one of the mail systems normally at his disposal. In other words, it would be advantageous to integrate the messaging systems efficiently, particularly voice mail and electronic mail systems because of their relative prevalence, such that all types of mail items are available from any system.

The prior art has suggested several possible integrated messaging systems, all of which have their disadvantages. One system includes a human operator who takes the phone message, when the receiving party is unavailable and manually types in a notification which is sent to the receiving party's electronic mail. In this system, the receiving party has notification of the message, but because of the manual nature of the transaction, only a limited amount of information is generally forwarded. The user does not generally have access to an entire voice message at his data terminal as he would with a voice mail system.

At least one other proposed integrated messaging system would allow a recipient to access both text and voice messages from either the electronic mail system or the voice mail system. However, the recipient must designate which messaging system is to receive all of the messages. This is a burden on the recipient who must be able to project to which system he is more likely have access and whose plans may be subject to change. If the recipient guesses incorrectly, both types of mail may be unavailable. The capabilities of the terminals of the respective systems differ greatly in capability, a computer terminal is more versatile in handling some of the media types than a telephone. Choosing the more readily available system, voice mail, because of uncertain travel plans can lead to the loss of considerable message content. Further, prior systems send the entire content of a message to the designated recipient service which reduces system performance given the large amount of data in a multimedia message.

Only a limited degree of integration of the various messaging services is taught by the prior art. Usually, the recipient is only notified that he has messages on one or more of his message services. If the messaging systems are not well integrated with a consistent message protocol, there is always the possibility that a foreign message will be rejected.

SUMMARY OF THE INVENTION

It is therefore an object of the invention to integrate a plurality of messaging system which handle messages of different media types into an integrated messaging system.

It is another object of the invention that mail of any media type and originating from any messaging system coupled to the integrated messaging system can be accessed at a terminal associated with any of the messaging services.

It is another object of the invention to a request from a local terminal to access message functions from a foreign messaging system.

It is another object of the invention to build an integrated in-basket containing all the mail to a recipient, regardless of media type, at each message service in the integrated messaging system.

It is another object of the invention to guarantee that each in-basket has the identical mail items.

It is another object of the invention to request message functions from a foreign messaging system be performed at a terminal coupled to the foreign messaging system at a local terminal.

These and other objects are accomplished by an Integrated Messaging System (IMS) which integrates mail from a plurality of mail servers handling messages such as electronic mail and voice mail as well as media such as facsimile, video and image. The IMS maintains synchronicity between all in-baskets for all mail systems, eliminating the need to collect E-mail and voice mail separately. In its most preferred embodiment, any terminal interface, telephone or computer workstation, can be used to generate, manipulate or receive a message of any media type. Although the capabilities of the terminal device may limit the user's ability to handle certain types of media, e.g., video. Thus, from the preferred system terminal, the user can access messaging services from any mail server in the IMS to collect, create, and act upon messages of any media type. The IMS includes a variety traditional E-mail and voice mail functions which can be used for any message.

In the preferred embodiment, the IMS comprises a plurality of file servers each coupled to a plurality of workstations. Before modification for inclusion in the IMS, each file server and its associated terminals and workstations were configured to handle message services of a particular media type. The file servers are coupled together by the IMS, which allows workstations which are coupled to a file server which normally handles messages of a particular media type to request messaging services from a file server which handle messages of a second media type. Thus, by requesting the appropriate file server, any terminal can create and access mail regardless of media type. Each file server includes a message store for the messages of the media type which it handles, as well as a message pointer store which serves as an in-basket. The message pointer store includes message pointers for all the messages to system users regardless of media type. The message pointer store is partioned into a plurality of mail baskets and note baskets for each user of the file server. Each file server contains media extension code which allows a protocol conversation with the IMS and contains new definitions for message pointers of foreign media types. The media extensions also automatically shadow mail pointers to the IMS which sends copies of the message pointers to the recipient's mail baskets at each of the other file servers. The IMS also includes synchronization means which checks to see whether the mail count in each in-basket is the same to guarantee that the same mail items are in each file server in-basket.

An Integrated Messaging Protocol (IMP) is used to pass information between the file servers. It is designed in a generic manner to allow wide variety of foreign message formats at each of the respected media file server. Each request will generate a corresponding response within the protocol. These requests and responses in the IMP are mapped onto local requests and responses by the media extension at both the requesting file server and the responding file server. The IMP is independent of message body format, referencing only the message pointer in the file servers.

BRIEF DESCRIPTION OF THE DRAWINGS

These and other objects and features will be more readily understood from the following description and attached drawings which include:

FIG. 7 is a block diagram of an alternative embodiment of the integrated message system.

FIG. 9 shows the general message format in the Integrated Messaging Protocol as well as some specific message requests and message responses.

DETAILED DESCRIPTION OF THE DRAWINGS

Figure 1:
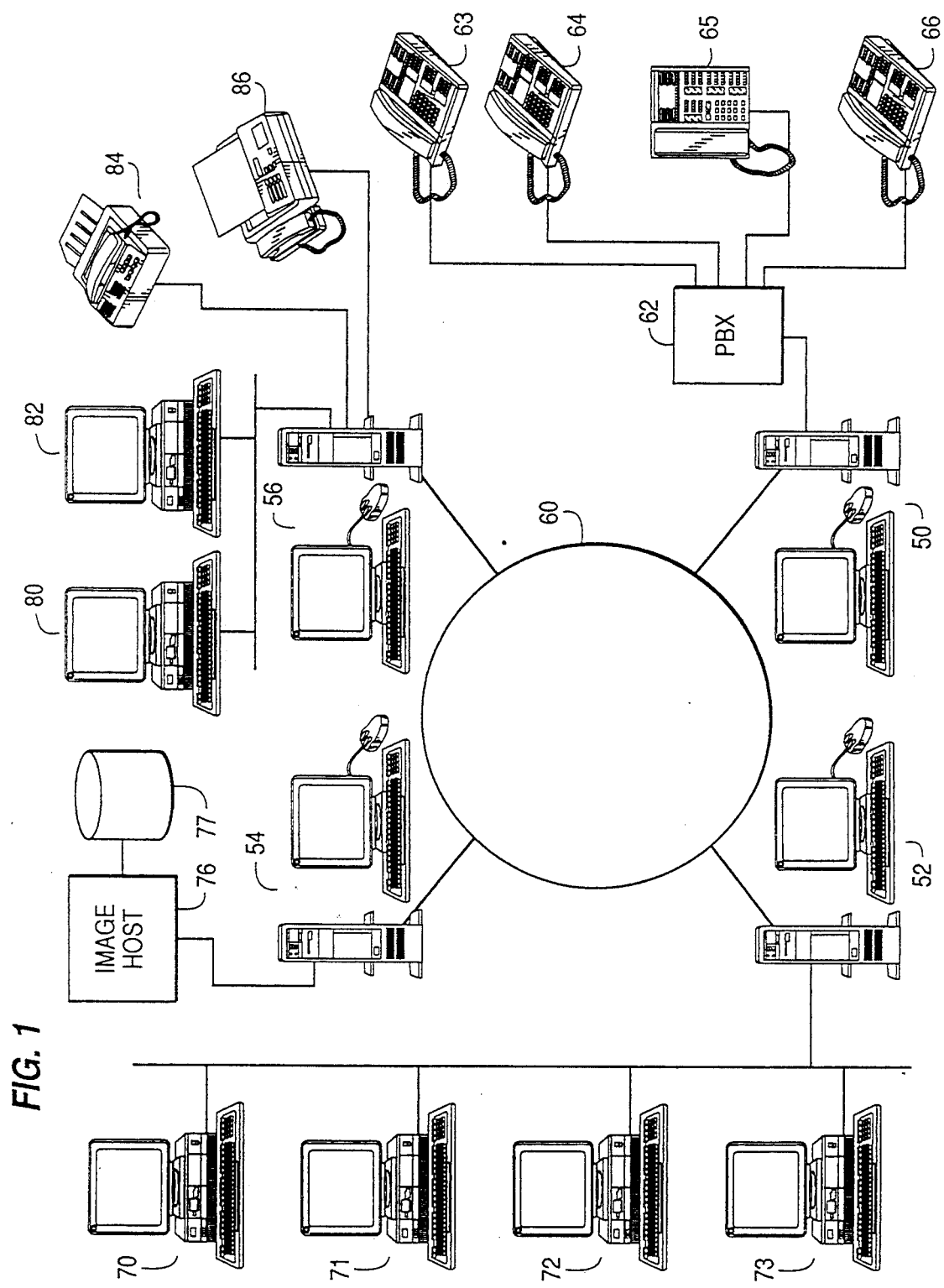
FIG. 1 is an overall diagram of one preferred embodiment of the electronic hardware in the integrated messaging system.

The invention may be run on a variety of different computers operating under a number of different operating systems. However, for purposes of illustration, one preferred embodiment of the Integrated Messaging System (IMS) is shown in FIG. 1. A plurality of media file servers 50, 52, 54 and 56 are coupled together into a local area network (LAN) by a shared bus 60 such as the IBM Token Ring network. Each media file server handles messages of particular media type and has associated terminals which also handle messages of the same media type. As the file servers are coupled to each other through the IMS, each terminal can request messaging services from the other file servers, enabling the terminals to handle messages any media type handled by the file servers in the IMS. The messaging service may be performed by either the requesting terminal, or, if the requesting terminal is hardware limited, by a terminal associated with the file server from which the messaging service was requested. The bus structures depicted in FIG. 1 coupling the terminals to their respective file servers are merely illustrative. The workstations can be on the same token ring as the servers, or different rings communicating to the servers via bridges between rings, etc.

The voice messaging server (VMS) 50 is responsible for voice messaging functions and allows for remote telephone access to all messages and interfaces with the local telephone switch or PBX 62. The programming on the VMS 50 which provides voice mail functions can be any of a number of commercially available platforms with suitable modifications to accept messages of other media types. Typical voice server functions include: create, revise, send, forward and append voice mail items, save a mail item in the voice mail store, and update the VMS addresses. The PBX 62 is connected to telephone terminals 63, 64, 65 and 66 and outside telephone lines.

The electronic mail or office server 52 drives the office e-mail and directory functions and allows access to the Integrated Messaging System by workstations 70, 71, 72 and 73. The office server code which drives the office functions has the appropriate revisions to handle messages of other media types. Typical office server functions include create, revise, send, forward and append text mail items, save mail items in the text mail store and update text mail addresses. In one preferred embodiment, the integrated messaging server software (IMSS) which is the piece of code which passes requests and responses between the mail systems as well as keeping the message counts synchronized in each recipient's in-basket on each of the mail systems is also resident on the office server 52.

Image server 54 is also coupled to the Token Ring 60. It is part of an image system capable of handling of image data. The image system will typically comprise a dedicated host system 76 with its own set of workstations (not pictured) together with DASD and optical storage 77 for the image data. Typically, image systems will archive digitized images of documents entered into the system by video camera or scanner which are compressed and stored in image files referred to as image objects. The image system contains image application code which scans, stores, retrieves, displays or exchanges the archived images. An image system is described in co-pending, commonly assigned patent application Ser. No. 211,646 by C. A. Parks et al., entitled "Dual Density Digital Image Systems filed Jun. 27, 1988 which is hereby incorporated by reference. Another co-pending patent application is by C. A. Parks et al., entitled "Object Management and Delivery System Having Multiple Object Resolution Capability", Ser. No. 211,722, filed Jun. 27, 1988 which is commonly assigned and is also hereby incorporated by reference.

A facsimile server 56, also on the token ring 60, couples a plurality of facsimile machines 84 and 86 to the IMS. The facsimile routing system also comprises facsimile workstations 80, 82 to which the facsimile images may be sent. Alternatively, the facsimile machines could be replaced by facsimile cards in either the facsimile server 56 or the facsimile workstations 80, 82. Facsimile server functions include: create, send, forward facsimile mail items. The facsimile workstations are used for further distribution and/or routing of the facsimile messages. Distribution lists and cover sheets for each user can be stored at the facsimile workstations or facsimile server to facilitate routing. A facsimile routing system is described in co-pending, commonly assigned patent application Ser. No. 693,739 to Argenta et al., entitled "Apparatus and Method of Operation For Facsimile Sub-System and An Image Archiving System", filed Apr. 30, 1991 which is hereby incorporated by reference.

The servers 50, 52, 54 and 56 communicate over the IBM token ring (TR) network 60, using the Integrated Messaging Protocol (IMP), a message protocol designed in a generic fashion so that any of the systems can pass message pointers of mail items of foreign media types. Each of the media file servers process and store mail of their respective media types. In addition, users at terminals associated with a particular server and media type are able to contact other media servers in the IMS network for mail functions of a different media type than that normally associated with the terminal. The IMP passes both messages and message pointers seamlessly from server to server in the IMS. However, most transactions do not require the actual message content, message pointers which are much smaller than the message content are passed and stored to reduce storage requirements and processing time. Further, a foreign message pointer is much easier to accommodate than a foreign message or unknown format.

The servers 50, 52, 54 and 56 and the workstations 70, 71, 72, 73, 80 and 82 preferably belong to the IBM line of the IBM PS/2 TM family of personal computers running on IBM's OS/2 TM operating system software. As depicted in FIG. 1, servers 50, 52, 94, 56 are IBM Model 80 servers and workstations are PS/2 Model 50 personal computers. They include well known components such as a system processor unit, ROM, RAM, hard and floppy disk drive storage, one or more system busses, a keyboard, a mouse and a display. The personal computers must also contain an I/O adapter card which allows communication between the MicroChannel (TM) bus within the personal computer and the external bus, e.g., the Token Ring Network 60. Information on the PS/2 family can be found in Technical Reference Manual Personal System/2 (Model 50, 60 Systems) Part No. 68X2224 (S68X-2224) and Technical Reference Manual, Personal System/2 (Model 80) Part No. 68X2256 (S68X-2256). Further information can be found on the Token Ring Network in "IBM Token-Ring Network Introduction" publication no GA27-3677 available from the IBM Corporation.

Alternatively, the servers and workstations could belong to the IBM RISC System/6000 family of workstations running on the AIX operating system. Further information on the RISC System/6000 can be found in IBM RISC System/6000 POWERstation and POWERserver Hardware Technical Reference—General Information Manual (SA23-2643), IBM RISC System/6000 POWERstation and POWERserver Hardware Technical Reference Options and Devices (SA23-2646), IBM RISC System/6000 Hardware Technical Reference—7012 POWERstation and POWERserver (SA23-2660), IBM RISC System/6000 Hardware Technical Reference—7013 and 7016 POWERstation and POWERserver (SA23-2644) and IBM RISC System/6000 Hardware Technical Reference—7015 POWERserver (SA23-2645).

The terminals coupled to the IMS may be located within the same area or at a remote location. For example, workstation 70 may be located on the same desktop as phone 63, and workstation 72 may be located on the same desktop as phone 64. Workstations 71 and 73 may be coupled to the IMS by fiber optic cable several miles away in an area in which phones are not allowed, e.g., certain government secure buildings, while phone 65 is located in a different city and state from the IMS. Phone 65 could be located in an airport terminal, or a user's car phone.

Figure 2:
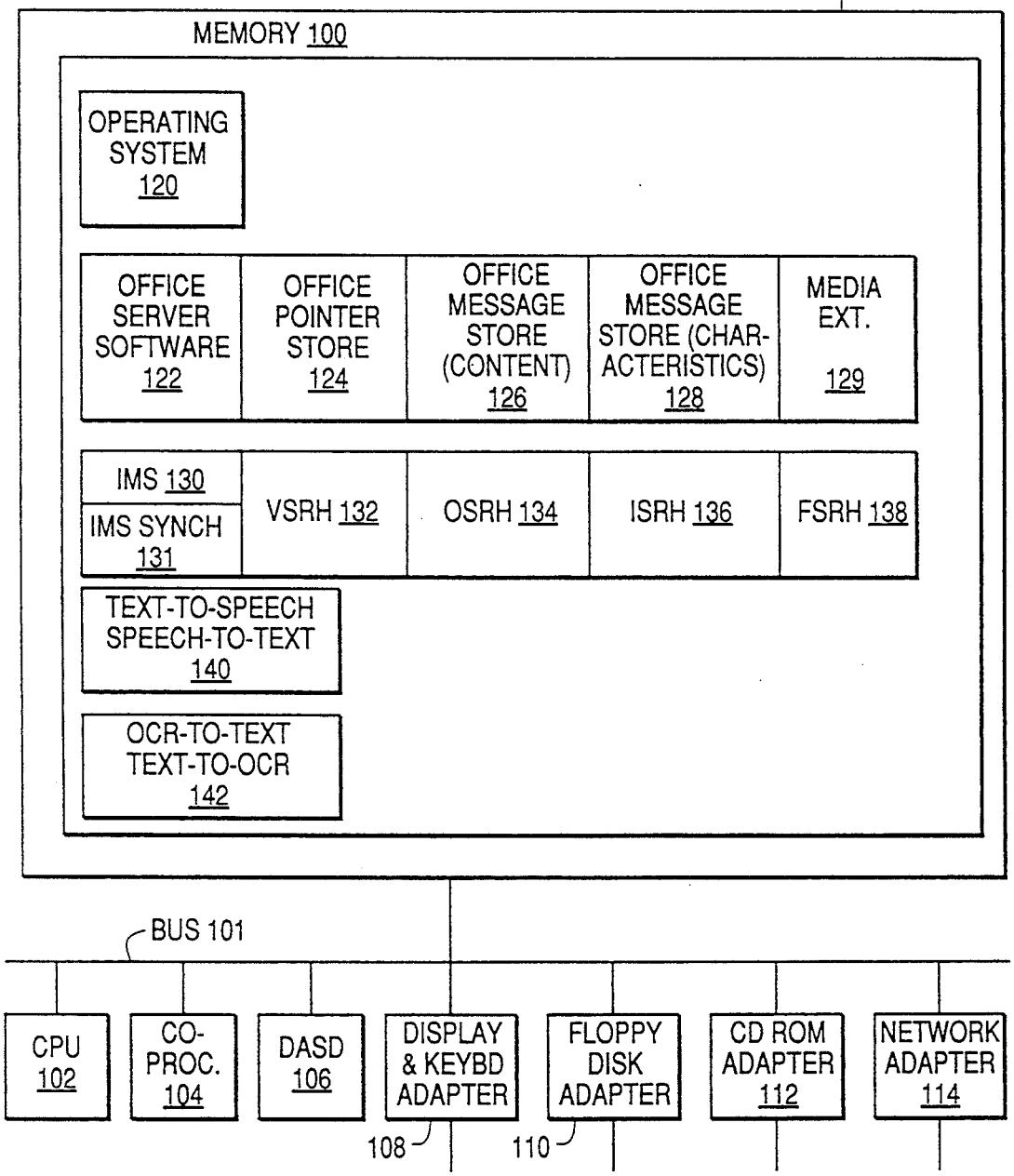
FIG. 2 is a block diagram of the office server.

Referring to FIG. 2, an architectural block diagram of the office server 52 is shown. Those skilled in the art use the terms "server" and "file server" to describe both the data processing system in charge of message process and control of a particular media type within the IMS and the software in the system which contains the sets of instructions which allow the data processing system to accomplish these functions. In the following description, the terms "server" or "file server" will denote a piece of hardware, whereas the term "server software" is the code that drives the hardware. As shown in FIG. 2, a memory 100 is coupled by means of a bus 101 to a central processing unit 102 an optional co-processor 104, disk storage 106, display and keyboard adaptors 108, floppy disk adaptor 110, CD ROM adaptor 112. The office server 52 communicate via to the token ring via network adaptor 114 which is also coupled to bus 101.

In the memory 100, there are a plurality of code modules which contain sets of instructions which allow the server to carry out its functions. Operating system 120 contains instructions to control the hardware which makes up office server 52 including functions for input-/output control, compilation, storage assignment, file and data management functions. The office server software 122 provides the office electronic mail and directory functions within the Integrated Messaging System. In the preferred embodiment, OfficeVision/2 TM is used as the office server software. Further information on OfficeVision/2 can be found in the OV/2 Using Guide order no. SH21-0421 available from the IBM Corporation. It also includes an office pointer store 124 for storing pointers indicating the data location of office messages which are stored in office message store registers 126 and 128 as well as the other servers in the IMS. To comply with the Document Interchange Architecture (DIA), one of the standard architectures within *System Network Architecture* (SNA) of the IBM Corporation, each office mail item is stored in two files. The office message store (Content) (126) file stores the content of the mail item which is called the document. A second file, the office message store (Characteristics) 128 contains information about the mail item and is called the interchange document profile. A technical reference manual, Interchange Document Profile, document number D-5002-883 is available from the IBM Corporation. The media extension code module 129 allows the office server software 122 to handle messages pointers of different media types than text. In the office system, this can be done by adding definitions for the various media type into an IDP field which normally defined the document type as a certain format, e.g., RFT, internal WP. Other fields are augmented to carry media-specific information such as voice message duration. Within the media extension, there is a piece of code which maps office system requests to IMP requests, there is another piece of code which maps IMP responses to office system responses. Thus, the office server is able to communicate via the IMP to the Integrated Messaging Server Software 130. Also, in the media extension 129, is code which automatically shadows (sends copies of) mail pointers sent to the office pointer store 124 to the IMS server 130.

The Integrated Messaging System server 130 is divided into four major components: a component to handle requests which originate from the voice messaging server, the Voice System Request Handler (VSRH) 132, a component to handle requests from the Office (or text) server, the Office System Request Handler (OSRH) 134, a component to handle requests from the Image Server, the Image System Request Handler (ISRH) and a component to handle requests from the Facsimile Server, the Facsimile System Request Handler (FSRH) 138. Other request handlers would be added if additional mail servers or media types were included in the IMS. The request handlers also handle the shadow mail pointers which originate from mail activity in one of the IMS file servers, refer to a table which includes information on the recipient's other mail baskets and forward copies of the shadow mail pointers to the recipient's mail baskets on the other file servers. A router in the IMSS 130 catches the response to a particular request and route the response to the same request handler which handled the request. The IMS also comprises a Synchronization Module 131 to assure that the recipient's in-baskets at all his services have the same mail items regardless of server origination or media.

Also in Memory 100 are Text to Speech and Speech to Text Code Module 140, and Optical Character Recognition to Text, Text to Optical Character Recognition Code Module 142. These modules allow mail to be translated from one system to another. For example, voice mail can be translated to a text message by the speech to text code module 140. Further, image data in a designated region of a document can be converted into ASCII characters by the OCR to text module 142 and then into a voice mail message by the text to speech code module 140. The IMS server 130 contains routines which call the translation modules 140, 142 when translation services are desired. The particular format of the message body may be required for translation services. Thus, a plurality of format types for each media would be defined in the augmented document type fields. Most operations in the IMS do not require translation services as they involve transactions which involve message pointers rather than the message body of a particular mail item. In alternative embodiments, translation code could be included in the media extensions of the various file servers.

Figure 3:
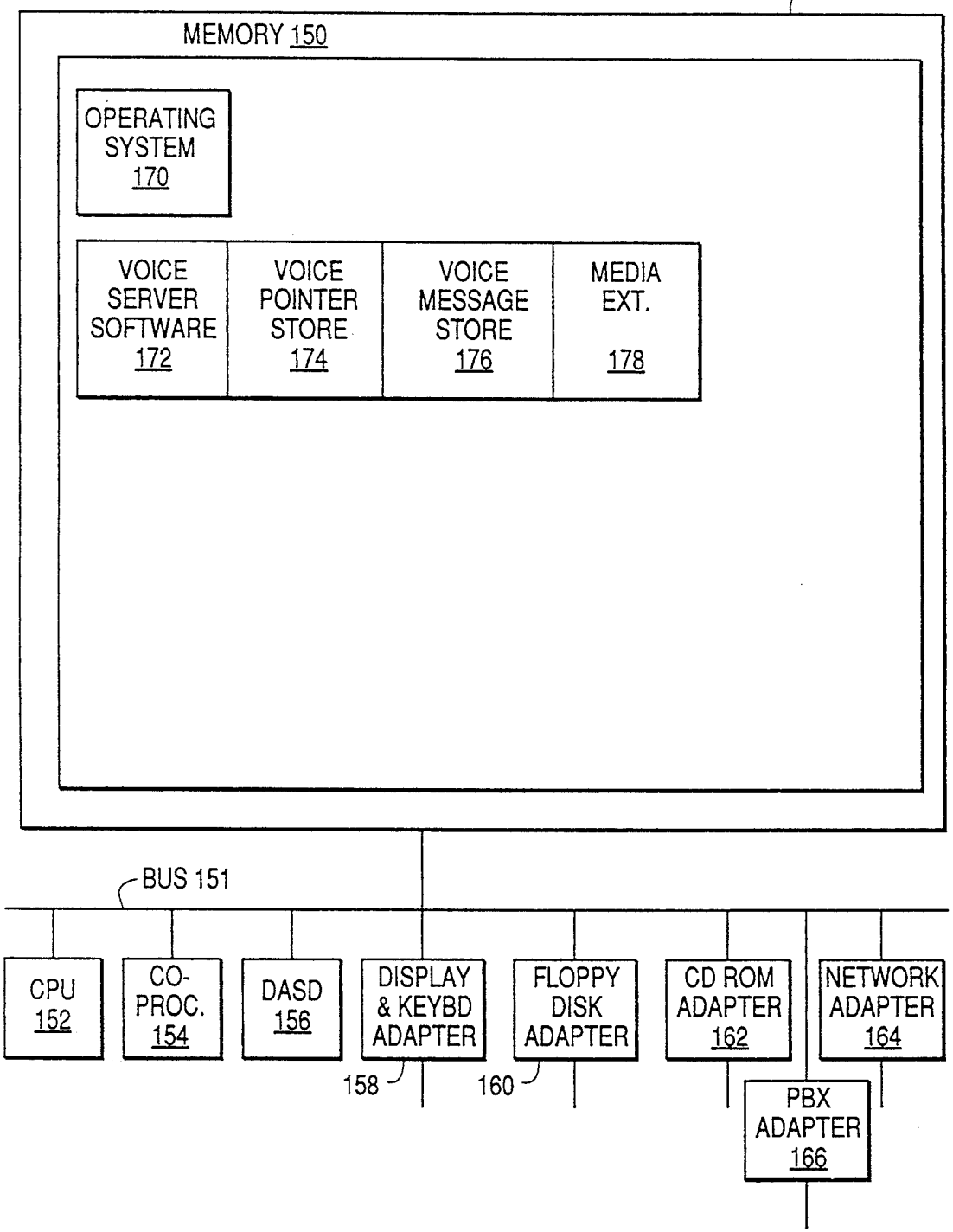
FIG. 3 is a block diagram of the voice server.

Referring to FIG. 3, the voice message server 50 is depicted in architectural block form. The memory 150 contains code modules which allow the server to perform voice messaging services and is coupled via bus 151 to central processing unit 152 and co-processor 154. Also coupled to the bus 151 are disk storage 156, the display and keyboard adaptor 158, floppy disk adaptor 160, CD ROM adaptor 162, and network adaptor 164. Also coupled to bus 151 is PBX adaptor 166, which allows communication via the PBX to client phone terminals as well as outside telephone lines. Within memory 150, operating system 170 controls the hardware of the voice messaging server and may be a different operating system than that of the office server.

Also, within memory 100, voice server software 172 is used to perform typical voice messaging functions, such as recording and playback of voice messages, voice message editing, delivering voice messages and message pointers and attaching voice message buckslips onto existing mail items. Compression software to reduce storage requirements at the voice file server by compressing the voice files are included. The voice server software 172 may also include encoding and decoding modules which translate voice messages from one format to another, for example, the PCM format used for telephone transmission to a format suitable for a workstation speaker. It comprises a voice pointer store which allows the voice messaging server 172 to construct the recipients' in-baskets from both voice messages which are stored in the voice message store 176 as well as other mail items which are stored at one of the other servers in the integrated messaging system. In the embodiment illustrated in FIG. 3, a single voice message store 176 is used rather than two files in the office server 52. Within the IMS, as all servers need not use the same operating system, they may not conform to the DIA Guidelines. Finally, the media extension 178 allows the voice server to handle mail items from other media such as, text, image or facsimile. The media extension 178 includes the definition of new message pointers and code which maps voice system requests and responses to IMP requests and responses as well as shadowing voice mail pointers to the IMSS.

Figure 4:
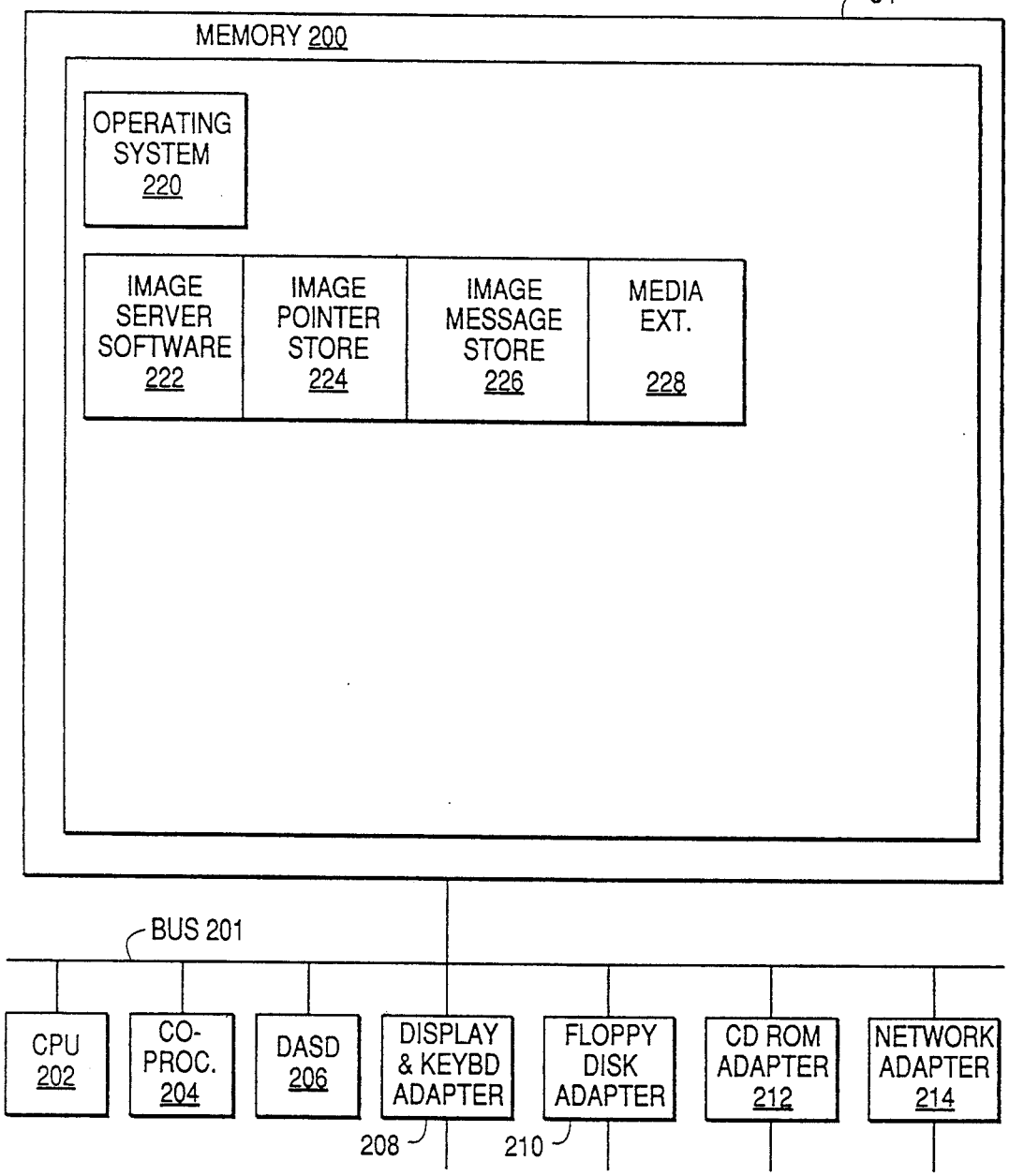
FIG. 4 is a block diagram of the image server.

Referring to FIG. 4, the image message server 54 is depicted in architectural block form. The memory 200 contains code modules which allow the server to perform image messages inserves and is coupled via bus 201 to central processing unit 202 and co-processor 204. Also coupled to the bus are disk storage 206, the display and keyboard adaptor 208, floppy disk adaptor 210, CD ROM adaptor 212, and network adaptor 214. Within memory 200, operating system 220 controls the image messaging server hardware and is likely to be the same operating system on the office server. Image server software 222 is used to perform typical image messaging functions, including recording, editing and deleting image messages and delivering image message pointers. It comprises a image pointer store 224 which allows the image messaging server 222 to construct each recipient's in-basket from both image messages which are stored in the image message store 226 as well as other mail items which are stored at one of the other servers in the integrated messaging system. Finally, the media extension 228 allows the image server to handle mail items from other media such as text, voice or facsimile. As above, the media extension 228 includes the code to handle foreign message pointers and translate image system requests and response to IMP requests and responses and shadow image mail pointers to the IMSS.

Figure 5:
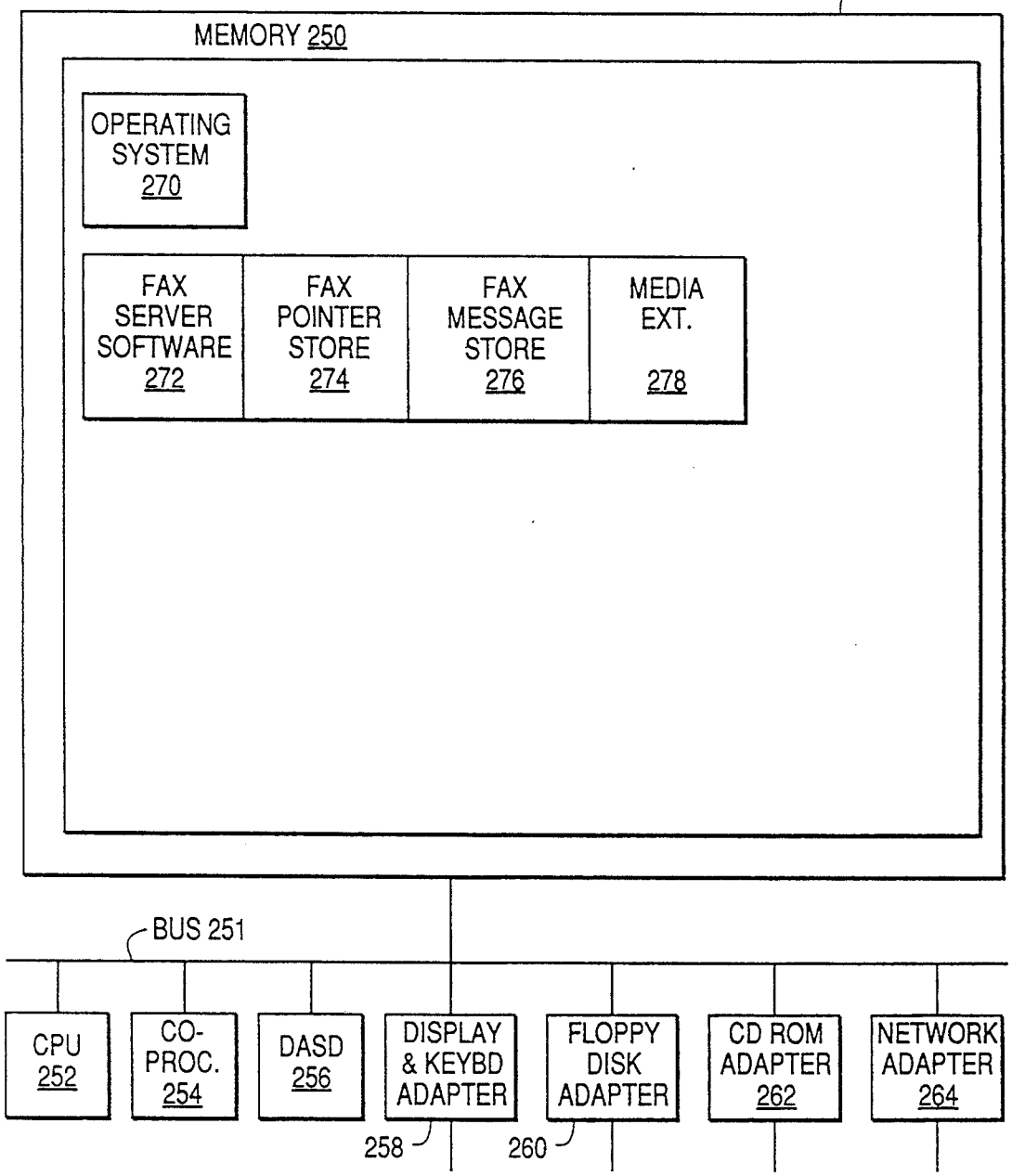
FIG. 5 is a block diagram of the facsimile server.

Referring to FIG. 5, the facsimile message server 56 is depicted in architectural block form. The memory 250 contains code modules which allow the server to perform facsimile message services and is coupled via bus 251 to central processing unit 252 and co-processor 254. Also coupled to the bus are disk storage 256, the display and keyboard adaptor 258, floppy disk adaptor 260, CD ROM adaptor 262, and network adaptor 264. Within memory 250, operating system 270 controls the hardware and the facsimile messaging server and may or may not be the same operating system on the office server. Facsimile server software 272 is used to perform facsimile messaging functions, such as recording facsimile messages, receiving facsimiles from external or internal sources, storing facsimile documents and delivering facsimile message pointers. It comprises a facsimile pointer store 274 which allows the facsimile messaging server 272 to construct the recipients' in-baskets from both the facsimile messages which are stored in the facsimile message store 276 as well as other mail items which are stored at one of the other servers in the IMS. Finally, the media extension 278 allows the facsimile server to handle mail items from other media such as text, voice or image. The media extension 278 includes translation code which allows the facsimile message server 56 to convert facsimile requests and responses to the IMP as well as the message pointers to the other mail servers. As above, the media extension 278 also shadows facsimile mail pointers to the IMSS.

Figure 6:
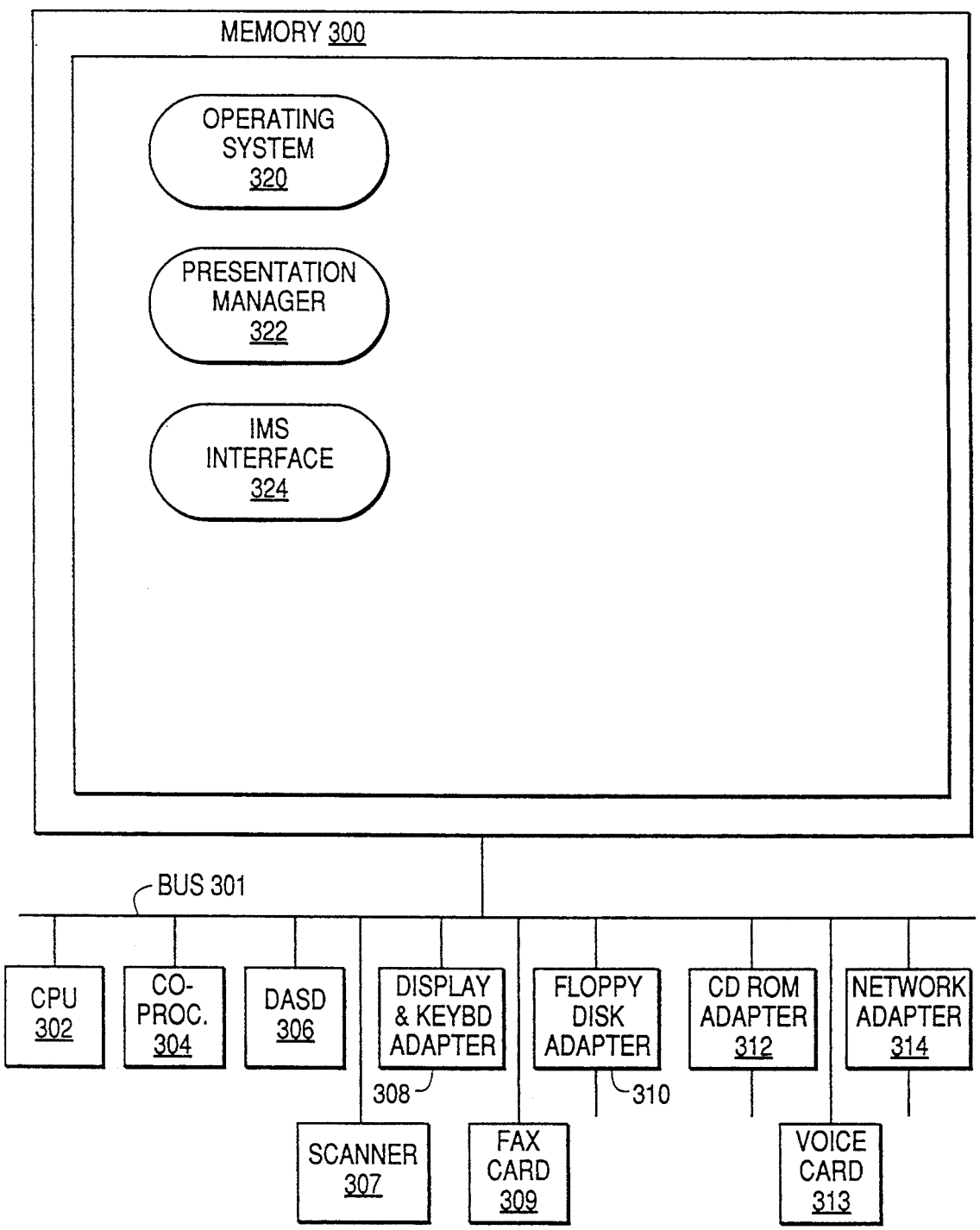
FIG. 6 is a block diagram of the office workstation.

FIG. 6 depicts an office workstation 70 in architectural block form. The memory 300, which contains operating system 320 and presentation manager 322, is coupled via bus 301 to the central processing unit 302, and co-processor 304. Also coupled to bus 301 is disk storage 306, display and keyboard adaptor 308, floppy disk adaptor 310, CD-ROM adaptor 312, and network adaptor 314. The workstation 70 may include a scanner, a facsimile card, and a voice card (not pictured) so that image, facsimile and voice mail items may be entered at the office workstation. However, in the preferred embodiment, no additional hardware is attached to the workstation 70. Instead, the user will rely on the capabilities provided by the terminals attached to other servers. For example, rather than go to the expense of having a voice card installed at each workstation, the workstation user can cause his telephone to call him back by issuing office system requests to the VMS. Also contained within memory 300 is the IMS interface 324 which is a series of API's which allows the office workstation user to request messaging services from the office server as well as voice, image, and facsimile servers. The IMS interface 324 is largely based on the interface between the office workstation and the office server software with modifications which allow the user to access services from auto messaging systems connected to the IMS. An office system request will be passed to the integrated messaging system server, so that services from one of the other mail servers can be invoked.

An alternative embodiment of the integrated messaging system is depicted in architectural block form in FIG. 7. In this embodiment, all of the mail system server programs, IMS Server 130', office server software 122', voice server software 172', image server software 222', and facsimile server software 272', are resident in memory 151 at a single data processing system 350 preferably an IBM mainframe in the 3090 family. There are other possible groupings of the media server software 122', 130', 172', 222', 272', on a network of data processors For example, IMSS 130', image software 222', and facsimile software 272', might be resident on the same server with office software 122' and VMS 172' resident on their own respective servers Operating system 120', preferably either IBM's VM TM or MVS TM operating systems, controls the functions of the other hardware attached to the system 350 (not shown). Further, both text to speech, speech to text software 140', optical character recognition to text, text to optical character recognition software 142' are in memory 351. A serial bus 352 is used to pass messages to the media terminals. A description of the serial bus architectural can be found in *Serial I/O Architecture*, Part Number PKDO81102, a publication of the IBM Corporation, first published Feb. 29, 1989. Coupled to the serial bus 352 are office workstations 70', 71', 72', 73', facsimile workstations 80' and 82', image workstations 78', 79' and PBX 62'. Coupled to the PBX 62' are telephone terminals 63', 64', 65' and 66'. Coupled to the facsimile workstations 80' and 82' are facsimiles 84', and 86' respectively. Coupled to image workstation 79' and bus 352 is image storage 77' which comprises both DASD and optical disk storage.

Message Passing

Figure 8:
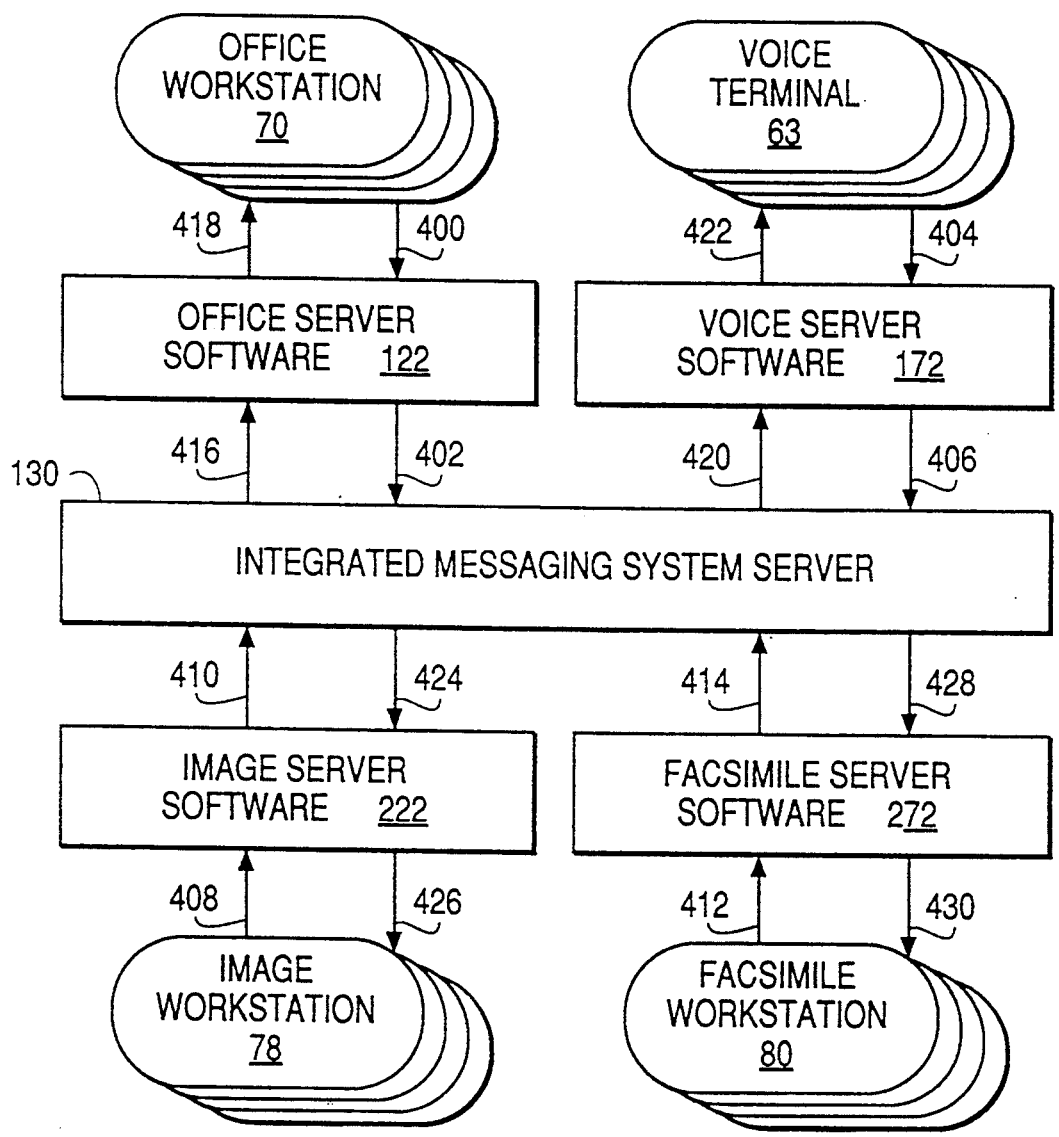
FIG. 8 shows the overall message flows in an IMS having electronic voice, image and facsimile mail systems.

FIG. 8 depicts the message flows between the various software components in the integrated messaging system. A request for messaging system services may be generated by users at any of the workstations or terminals coupled to any of the media file servers. For each request, a response is generated by the called messaging system and returned to the originating workstation or terminal. In one embodiment of the IMS, messages along flows 400, 404, 408, 412, 418, 422, 426 and 430 are in the protocol formats in which the servers normal communicate with their respective terminals and messages along flows 402, 406, 410, 414, 416, 420, 424 and 428 are in the IMP format. In other embodiment, the IMSS 130 is more closely coupled with one of the servers, for example, the office server software 122. Messages passed between the office server software 122 and IMSS 130 along flows 402 and 416 would be in the office system format.

An office system request 400 originated at office workstation 70 is passed to the office server software 122. If the office system request 400 requires input or participation from another mail system server, the office system request shown as flow 402 is passed on to the integrated messaging system server 130. Flow 402 also represents the direction of an office system response, resulting from a request by another server in the IMS. Likewise, voice system request 404 is generated at voice terminal 63. Voice system activity 406, including a voice system request which can not be accomplished by the VMS alone or a VMS response to another server, is passed by the voice server 172 to the integrated messaging system server 130. An image system request 408 is generated at image system 78 workstation. It can be passed by image server software 222 as a image server activity, e.g., a request, along flow 410 to the IMS server 130. Finally, a facsimile system request 412 generated at facsimile workstation 80 can be passed by facsimile service software 272 as a facsimile system request (flow 414) to the IMS server 130 if the facsimile server can not accomplish the entire task. Flow 414 also represent facsimile system responses to requests from another server.

After receiving a request from the software of one of the servers for a messaging service of another server, the IMS server 130 will then pass the request to the server software which can provide the requested function in the IMP format or the normal server format if it is closely coupled to the server. A request from voice terminal 63 for a text mail item stored in the office server is passed to the office server software 122 as an IMS request at flow 416. A request to record a voice mail message is passed to voice server software 172 as an IMS request at flow 420. Similarly, IMS requests 424, 428 for facsimile or image services are passed to the image server software 222 and facsimile software 272 respectively. The response from the called server is then sent back through the IMS server 130, for example, office system responses sent back at flow 402, voice system responses sent back at 406, image system responses sent back at 410, and facsimile system responses sent back at 414.

Office system requests and responses from the other servers to the office system requests passed to the Integrated Messaging System Server are processed by the OSRH. The office system requests include but are not limited to the following: deliver a text, voice, image or facsimile message pointer, deliver an acknowledgement, deliver a notification that a message is undeliverable, update a directory entry, delete a message pointer, save a message pointer in a mail cabinet, record a voice message, playback a voice message, dial a phone number, send an outbound facsimile.

Voice system requests and responses from the other server to the voice system requests passed to the Integrated Messaging System Server are processed by the VSRH. The voice system requests include, but are not limited to the following:. deliver a voice, text, image or facsimile message pointer, deliver an acknowledgement, deliver a notification that a message is undeliverable, update a directory entry, obtain a list of distribution lists, resolve a distribution list, delete a message pointer and save a message pointer in a mail cabinet, send an outbound facsimile.

Image system requests and the responses to the image requests and facsimile system requests and the response to the facsimile requests passed to the Integrated Messaging System are processed by the ISRH and FSRH respectively. Image system requests are generally the result of a image user requesting an action from an image workstation while facsimile system request result from actions at a facsimile workstation. Among image system and facsimile requests are the following: deliver a text, voice, image or facsimile message pointer, deliver an acknowledgement, deliver a notification that a message is undeliverable, update a directory entry, delete a message pointer, save a message pointer in a mail cabinet, record a voice message, playback a voice message, dial a phone number send an outbound facsimile (image request).

Several examples will further explain the flow of messages through the IMS and the type of actions available to the user. The first example, an office user at workstation 70 creates, plays and sends a voice message. As the office server software 132 does not possess the necessary voice mail functions, these requests must be passed to the voice server software 172. Each action at the office workstation 70 to record (create), play or send the voice message results in an office system request 400 being passed by the office server software 122 at flow 402 to the OSRH in the integrated messaging system server 130. Each request is then passed as an IMS request at 420 to the voice server software 172. The voice server software performs the necessary functions and passes a voice server system response at flow 406 to the OSRH. Each response is passed back to the office server software 122 as an IMS response at flow 116 and then back to the office workstation as an office system response at flow 118. In the IMS, each request will generate a corresponding response. The voice message once completed is stored at the voice server in the voice message store and the office server receives a pointer to the voice message. To send the message, the office server sends the voice pointer to the office in-basket of the intended recipient. Once the voice mail pointer is received at the office in-basket, the recipient's in-baskets at each of his other services are updated.

In the second example, the office user at workstation 70 adds a voice buckslip to an existing text message and forwards the text message and attached voice buckslip to a distribution list of office users. The creation of the voice buckslip generates message flows similar to the voice message generation example above. Each of the requests flows at 400, 402 and 420 to the voice server software to create the buckslip and then the responses are sent back to the office workstation 70 along flows 406, 416 and 418. Sending the text mail message to the distribution list involves only office system requests 400 to the office server software 122 and office system responses 418 back to the workstation 70. However, once an office workstation recipient wishes to hear the voice buckslips, he will generate commands back to the voice server software 172 through the OSRH for the needed voice mail services. Once the message is forwarded to the office distribution list, each recipients in-baskets at the other servers on which the recipient has an account are updated with message pointers.

In a third example, a facsimile workstation operator at facsimile workstation 80 wants to add a voice buckslip to a facsimile received from an outside telephone line and then to forward it to office users from a prestored distribution list. Also, the facsimile operator will designate a certain area on the facsimile to make it available for translation by the OCR to text and text to speech software if the recipients make a request to the IMS for additional information. After receiving the facsimile, the facsimile system request 412 for the voice buckslip is generated at workstation 80. As the facsimile server software 272 lacks the necessary voice mail functions to generate the voice buckslip, it is passed as a facsimile system request at flow 414 to the FSRH module in the integrating messaging system server 130. The request is passed along flow 420 as a IMS request to voice system server software 172 which issues the necessary voice system responses along flow 406. The voice system responses are processed by the IMS server 130 by the FSRH and forwarded along flow 428 as an IMS response. Finally, the facsimile server software 272 takes the IMS response, processes it and sends it back to the facsimile workstation 80 along flow 430 as a facsimile system response. After the voice buckslip is generated, the facsimile operator requests the office system server 122 to distribute the facsimile to office system users. The facsimile request will be issued at flow 412, forwarded at flow 414, handled by the IMS server 130 to the FSRH module, and sent as an IMS request at flow 416. The office server software 122 will respond to the facsimile workstation 80 once the distribution is complete along flows 402, 428, and 430. The facsimile will most probably be converted to ASCII characters by the OCR to text module, at the office server unless all the office workstations are equipped with suitable graphics software at APA displays. While the entire facsimile can be read at the display of the office workstation 70, designating an area by the operator allows a traveling user to access more information than provided in the voice buckslip from a telephone if desired. Once the message is forwarded to the distribution list, each recipient's in-baskets at the servers which he has an account are updated with message pointers.

In a fourth example, a voice user accesses a text message in the in-basket from voice terminal 63. The request to hear the message generates a voice system request at flow 404 to the voice server software 172. Upon realizing that the request contains text content which it does not have locally, the voice server software passes along the request to the IMS server 130 172 along flow 406 for the text content. There it is handled by the VSRH module and passed as an IMS request along flow 416 to the office server software 122. The office server software 122 sends the text message back along flow 402 as a office system response, the message is translated into speech by the text-to-speech code module and passed back to the voice server software 172 along flow 420. Finally, the voice server plays the message for the voice terminal 63 along flow 422 as a voice system response.

In a fifth example, a voice user accesses a voice message. The request to play the voice message is received by the voice system server along at flow 404. As the voice server software 172 possess the necessary capabilities, the request is handled locally and plays the message back as a voice system response along flow 422. No interaction is required with the IMS server 130.

In the sixth example, an office user at office workstation 70 scans in a document at the workstation scanner, adds it to the image store and request the facsimile system to send the image to an external distribution list. After scanning of the document, the request to store the document originates as an office system request along flow 400, is passed to the OSRH module at the IMS server 130 along flow 402, and is passed to the image server software 222 along flow 424 as an IMS request. After the image is stored, an image system response is generated along flow 410, passed along 416 as an IMS response and then further along flow 418 as an office system response to notify the office user that the image has been stored successfully. The request to the facsimile station to send the image to outside telephones then proceeds. An office system request is generated at flow 400, passed along flow 402, handled by the OSRH in the IMS to convert it to an IMS request at flow 428. The facsimile software 272 processes the necessary functions, e.g., dialing the external numbers on the distribution list, establishing connections, adding cover sheets to the document, and transmitting the document, and sends a facsimile system response at completion along flow 414. It is processed and sent as an IMS response along flow 416 to the office server software 122 which transmits the response back to the workstation 70 and as an office system response along flow 48 to notify the office user that the facsimiles were successfully transmitted.

Integrated Messaging Protocol (IMP)

The requests and responses described in connection with FIG. 8 above are part of the Integrated Messaging Protocol (IMP) which has been defined for the IMS to allow for a conversation between messaging systems. The conversation shares messaging and directory information and functions between unrelated systems, to provide a seemingly integrated view to the end user. The protocol consists of various "verbs" which indicate the function to be performed, and the fields associated with the function request. Each function request has a similar function response which is also laid out in the verb/field format. Functions provided include messaging type requests (record, playback, send), autodialing, as well as in-basket and directory synchronization and maintenance. The IMP is laid out in the tables which follow the description of the invention.

The protocol is designed to allow wide variety of foreign message syntax types at each of the respective media servers. In general, mail system can get into difficulty trying to work with foreign message bodies, because of their lack of accepted standards for different media types. For example, there are several digitalized voice coding schemes, if one scheme was chosen for IMS the system might be limited to working with voice messaging servers that support that particular voice coding scheme only. Instead, the protocol was designed so that the voice message header is referenced only, and not the voice message body. Thus, the integrated messaging system is independent of the message body format, the text, voice, image, and facsimile mail items are accessed by the respective mail servers by the text sequence number, voice sequence number, image sequence number, or facsimile sequence number. The voice messaging server may not know about the format of the facsimile document, for example, but only the sequence number and the facsimile server message store.

All requests to the voice system server require a VSUSERID and VSNODEID. All requests to the office system server require a TSUSERID and TSNODEID. Similarly, all requests to the image system server require a ISUSERID and a ISNODEID and requests to the facsimile system server require a FSUSERID and a FSNODEID. The order of the parameters is not important (see message format in tables). Any LISTS of fields (e.g. DISTLIST), should be returned along with a count parameter for error checking. The voice system is the owner of voice messages. The office system is the owner of text messages. The image system is the owner of image messages. The facsimile system is the owner of facsimile message. Each system server will shadow message pointers of the messages belonging to other servers. All updates to messages will be applied to the owning system first, and then broadcast back to the requesting system after completion, and then to the other servers. For example, an office system request to update a voice message will update the message pointer file in the voice server first, the office server second, and then the image and facsimile systems. Each system will preferably access the distribution lists of the other servers, but in alternate embodiments of IMS, selected systems may be blocked from access to selected distribution lists.

Outcall notification, personal reminders, and pager notification are optional functions which may be supported by the VMS.

Message Pointer Passing—Control and Flow

When passing "message pointers" among text, voice, or other systems, the IMS acts as a conduit between the user's current system and any remote system from which the actual message may originate. The use of message pointers allows for disparate systems to merely reference a "foreign" message type through a predefined pointer format, without having to directly store or interpret the foreign message body. Message pointers also allow the various systems communicating through the IMS to maintain the status of reflected (i.e., synchronized) mail items. The Integrated Messaging Protocol (IMP) supports both message pointer and message body passing, offering a flexibility in the implementation of integrated message passing.

As shown in FIG. 8, the IMS allows the office, voice, image, and facsimile messaging systems to share text mail pointers, i.e., items native to the office mail system, voice mail pointers, image mail pointers and facsimile mail pointers through the IMP to update the in-baskets at the mail servers.

As discussed above, when an office system user wishes to send a new voice message, he first must record a new voice message. The office system user requests via the IMS that the VMS manage a recording session over the phone system, manipulate the recording to suit the user (e.g., pause, rewind, delete, replace, etc.) and end the recording when he is finished. Each of the actions of the user at the workstation results in an office request passed first to the IMS and then from the IMS to the VMS as an IMS request. The VMS performs the desired action and replies with a VMS response to the IMS which is passed to the EUI at the workstation.

After the recording has been completed, the VMS returns a voice message pointer to the user's workstation which references his/her recording held on the VMS. While the user is notified that a recording has been successfully completed and may now be sent or discarded, the EUI is designed so that is immaterial whether the new voice message is contained in their own machine or associated server, or merely referenced by a pointer to the VMS or other server in the Integrated Messaging System.

If the user then wishes to send the new voice message as a mail item, the office system user sends the voice message pointer to office system and/or VMS recipients via the IMS. After receipt of the send request, the IMS first requests the VMS to send the voice message pointer as a voice mail item to the appropriate VMS users, and then tells the office system system to send a VMS-style mail item, i.e., containing the voice message pointer to the appropriate office system users. Then, the IMS tells the facsimile and image servers to send the voice message pointer to the appropriate facsimile and image in-baskets.

When a new office system message is sent from an office system requester at an office workstation to other office users, the VMS is notified through the IMS of the office system mail items delivered to office system users via their office system message pointers. Upon sending a reflecting electronic text mail item i.e., containing the office system message pointer to the appropriate VMS user, the VMS returns the voice message pointer corresponding to the reflecting mail item to the IMS, which then tells the office system server to update the appropriate office system mail item with the voice message pointer information. Thus, when local mail is shadowed through the IMS the message pointer usage is reflected to all servers.

Once the entire scenario for either voice message or office message sends has run through a complete list of recipients, there are a set of office system mail items—delivered to office system users—each of which contains a voice message pointer to a VMS mail item which is either a recording or an office system-style message held on the VMS, and a set of VMS mail items—delivered to VMS Users—each of which contains an office system message pointer to an office system mail item which is either an office system message or a VMS-style message held on the office system system. Messages or mail items created on a system shall generate a corresponding remote message pointer which other systems may use to access/reference the system's message/mail item. Message pointers are used for either of two purposes: to act directly upon a remote system message, or to indirectly affect the status of a "reflecting" mail item (i.e., a reflection of the original) on a remote system.

In the IMS, when sending a new office system message from office system, the office system server automatically generates office system message pointers which the VMS server may use to indirectly affect the status of the corresponding office system mail items. On the other hand, the VMS will generate voice message pointers which the office system system may use to indirectly affect the status of their reflecting VMS mail items.

The IMP supports most schemes of direct and indirect reference to remote messages and mail items, effectively accommodating various item mailing schemes among different mail systems—each using the same IMS.

FIG. 9 depicts the general program-to-program message format of the encoded command verb and parameter fields in the IMP. The first field is Message Length (Msg Len) which is a 2 byte binary integer value equal to the sum of the Field Length (Fld Len), length of Verb ID, and length of the message length itself. The second field is Verb ID. Verb ID which is a 2 byte binary integer value of Command Verb ID. The Command Verbs are listed in tables 1 through 4 and are the request and responses for mail system serves, the Verb ID numbers are given in table 5. The third field is Field Length (FLD Len) which is a 2 byte binary integer value equal to the sum of length of Field Value, length of the Parameter Field ID, and length of (Fld Len). The fourth field is the parameter Field ID (Fld ID) which is a 2 byte binary integer value of Parameter Field ID. The Parameter Fields and the Field ID numbers are listed in table 7. They are also shown in tables 1 through 4 as a component of the command verb. The Field Value is a binary integer of length Field Bytes includes the data associated with the field, such as user ID, user Nodes, sequence number, date time and distribution list. The Field Length, Field ID and Field Value are repeated for each parameter in the verb.

FIG. 9 also shows the message formats for the RECORD, RECORDR, ENDRECORD, ENDRECORDR, PLAY AND PLAYR requests and responses in the IMP used in the first example above, where the office user creates, plays and sends a voice message from the office workstation. Referring both to FIGS. 8 and 9, the office system request to create a voice message generated at the office workstation 70 and passed to the office server software 122 at flow 400, is translated into IMP format into the RECORD request in FIG. 9. The RECORD request is passed by the OSRH module of the Integrated Messaging System Server 130 to the Voice Server Software 172 by Flow 420. The voice server software 172 responds to the RECORD request with the RECORDR response which is returned back to the office workstation along flows 406 and 416 and translated at the office server software 122 into a office system response 418. The user may cease the recording with the ENDRECORD request to the voice server software 172 and the voice server software 172 will respond with the ENDRECORDR response. To play back the message the office server software 122 will cause the PLAY request to be sent to the voice server software 172 which will respond with the PLAYR response, after being satisfied with the voice message, the user will request distribution of the voice message. This command will be translated by the office server software 122 as the SENDVOICE voice request. Upon completion, the SENDVOICER response will be sent by the voice server software back to the office server software and forwarded back to the office workstation. Once the voice message is received by the recipient's voice mail in-basket, a voice mail pointer or header is sent to the office server software 122 for the recipient's text mail in-basket by the verb CVHEADER. The office server software 122 will respond with the response CVHEADERR to note that the voice message pointer was received successfully.

As discussed above, the IMP is used between the file server software and the IMS server. The protocol is translated to normal message traffic between the terminals and their respective file servers. In the alternative embodiment where the IMS server is closely aligned with one mail server, communication between that mail server and the IMS server need not be in the IMP format.

The IMP requests and responses above are listed in Tables 1 and 2. The requests and responses for adding a voice buckslip to the text message and forwarding the text message with the attached buckslip, as set forth in the second example above, are essentially the same requests and responses. In the third example discussed above, where a facsimile user adds a voice buckslip to a facsimile and forwards the facsimile to office users, the RECORD, ENDRECORD, PLAY, SAVEVOICE AND SEEVOICE requests and the corresponding responses are used. To send the facsimile message to the office users on the distribution list, the CFHEADER and CFHEADERmessages are used. In the fourth example above, where a voice user accesses a text message, the voice system will send the GETTEXT request to the office system for the text message corresponding to the text pointer in the voice message in-basket. Along with the text body, the office system will reply with the GETTEXTR response. Once the voice user listens to the message, an UPDATETEXT request is sent to the office system to change the status of the office note to "open". After update, the office system responds with an UPDATETEXTR response. In the fifth example above, the voice user accesses the voice message; this is done within the office server. However, once the voice message has been opened an UPDATE VOICE request is transmitted to the other mail boxes to designate the voice message as opened. In the sixth example above, where the office user scans a document, adds it to image store and then request that the facsimile system send it to an external distribution list, the following requests, and responses are used: First, the RECORDIMAGE and the RECORDIMAGER responses and the SAVEIMAGE request and SAVEIMAGER response in Table 3. To send the document as a facsimile uses the DIALFAX and DIALFAXR messages.

Voice and Text Synchronization Flow Diagrams

Figure 10:
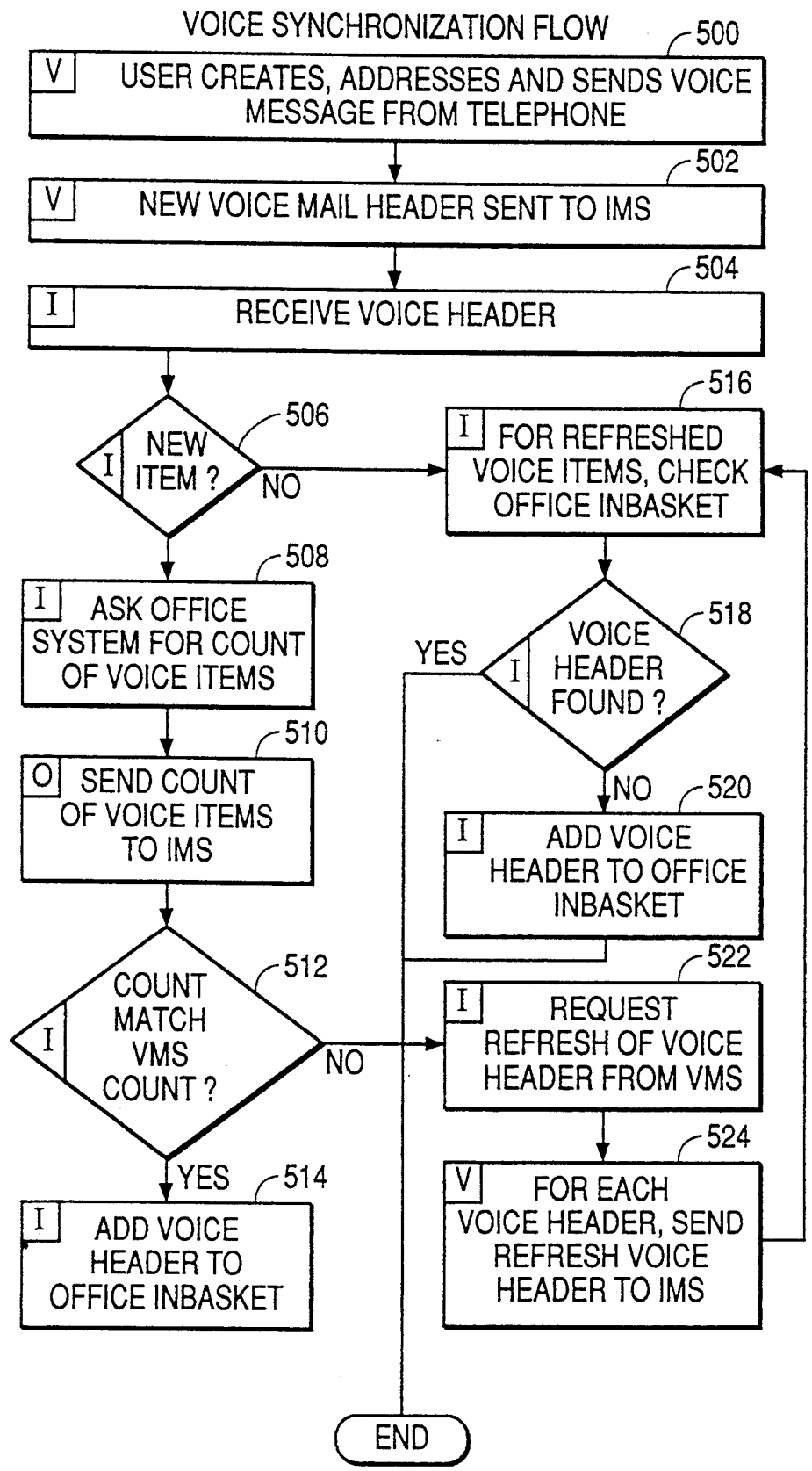
FIG. 10 is a flow diagram of the text synchronization procedure in IMS.

FIG. 10 shows the flow of logic between the office server, the voice mail server and the Integrated Messaging System software as a voice message pointer is delivered to an office workstation user who has a text mail account, but not image or facsimile accounts and a synchronization check is made to ensure that the office and voice server in-basket counts remain in synchronization. In the FIG., the actions taken by the VMS are denoted by a "V", the actions taken by the IMS are denoted by an "I" and the actions taken by the office server are denoted by an "O".

The process begins in step 500 with the user creating, addressing and sending a voice message from a telephone via the VMS. The voice mail pointer is sent to the IMS in step 504. The IMS receives the pointer in step 504 for further processing. First, the IMS checks to see whether the mail item is a new item, step 506. If the voice message pointer is a new item, IMS queries the office server for the count of voice items in the in-basket of the intended recipient in step 508. The office server sends the count of voice items to IMS in step 510. If the count of the voice mail items in the office in-basket matches the count given to the IMS by the VMS as the VCOUNT parameter of the CVHEADER field, step 512, the voice pointer is added to the office in-basket in step 514.

If the voice message pointer is not a new item, but a refreshed item, the IMS checks the office in-basket in step 516 for the voice message pointer. If the voice pointer is found in step 518, the process ends. If the voice pointer is not found in step 518, the voice pointer is added to the office in-basket in step 520 and the process ends.

If the voice mail item counts in the VMS and office in-baskets do not match in step 512, the IMS request a refresh of each voice pointer from VMS, step 522. For each voice pointer that VMS has in its in-basket, it sends a refresh voice pointer to IMS in step. The IMS then checks the office in-basket for the presence of each voice pointer and adds the voice pointer to the office in-basket if not found, steps 516, 518 and 520.

Figure 11:
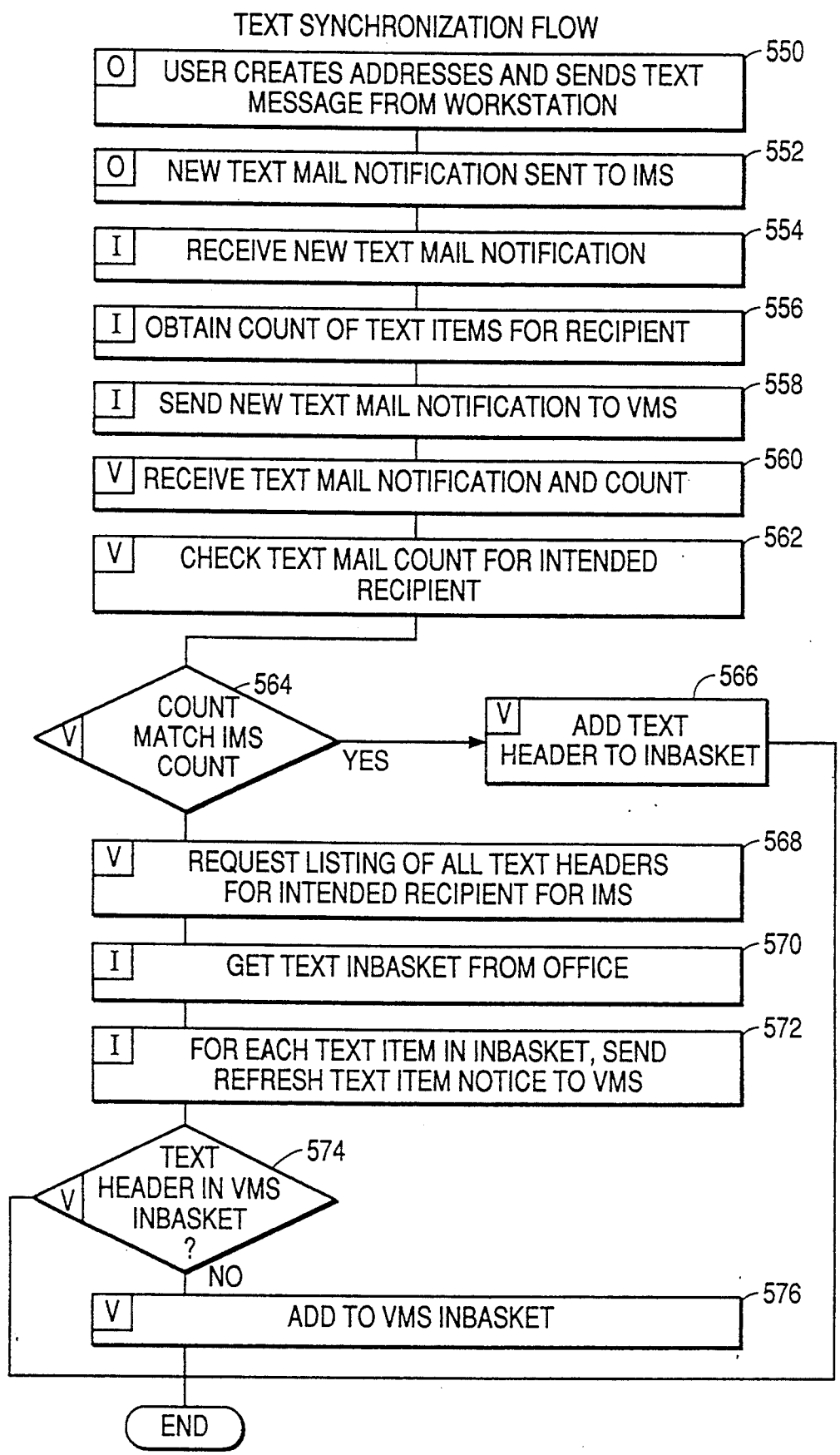
FIG. 11 is a flow diagram of the voice synchronization procedure in IMS.

FIG. 11 is a flow diagram of the logic between the IMS, VMS and office server as a text message pointer from an office workstation is delivered to a voice messaging user on the VMS and who has a voice mail account but not an image or facsimile account a synchronization check is made to ensure the in-basket counts remain in synchronization.

The FIG. begins as the workstation user creates, addresses and sends the text message from the workstation to the voice user in step 550. The office server sends a new text mail pointer to IMS in step 552 which is received by the IMS in step 554. The IMS queries the office server for the count of text items for the intended recipient in step 556.

The next text mail pointer and count are sent to VMS in step 558 and received by VMS in step 560. Next, VMS checks the text mail count received with the new pointer against the text mail count in the voice mail in-basket, steps 562 and 564. If they match, the text pointer is added to the voice mail in-basket in step 566 and the synchronization process ends. If the counts do not match, the VMS requests a listing of all the text pointers in the office in-basket from IMS in step 568 which passes the request to the office server in step 510 and retrieves the text items in the office in-basket. For each text item in the office in-basket, the IMS sends a refresh text item notice to VMS, step 572. The VMS compares each text pointer with those in the voice in-basket in step 574. If the text item is not present in the VMS in-basket, it is added in step 576° which concludes the text synchronization process.

The End User Interface (EUI)

One preferred End User Interface (EUI) is depicted in the following FIGs. for use on workstation terminals connected to the IMS, e.g., office workstation, image workstation or facsimile workstation. The interface was designed to be compatible with the OfficeVision/2 office management product from the IBM Corporation. It follows Common User Access guidelines which are detailed in Common User Access '91 Guide, publication number SC34-4290 and Developing Workplace Model Application, publication number GG24-3580 both available from the IBM Corporation. The EUI is primarily driven by the IMS interface code 324, see FIG. 6, in the workstation memory 300, changing according to user requests and responses from the file servers in the IMS.

Figure 12:
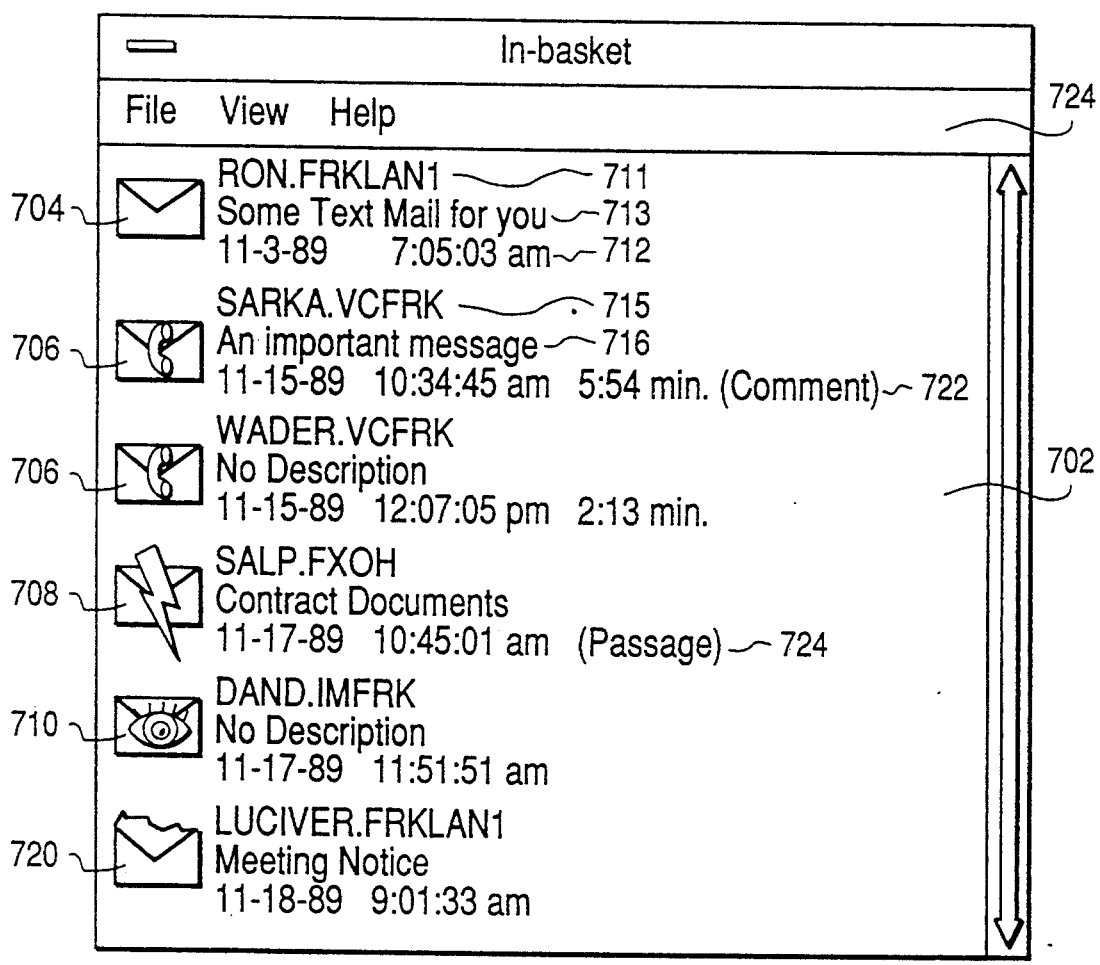
FIG. 12 is the integrated mail basket panel which notifies the recipient about the mail items.

The End User Interface for the IMS In-basket window 700 as it would be presented on the display of the office workstations is shown in FIG. 12. All types of mail can be presented in the in-basket. In the FIG., e-mail, voice, image and facsimile mail are shown in the client area 702. Preferably, each type of mail is denoted by a different icon. Envelope icon 704 represents electronic mail, the voice mail 706 is depicted as a telephone receiver over envelope. The facsimile icon 708 is a lightning bolt over an envelope and the image mail icon 710 is an eye over an envelope. An e-mail message will have the sender's user id and node id 711 and date and time 712 after the e-mail icon 704. Alternatively, the sender's first ad last name could appear instead of user id and node id after a table look-up. If desired, the sender may attach a short description 713. If the voice message is created at a workstation, the user and node id appear after the telephone/envelope icon 715. The voice mail sender may also type a short description 716 of the message at the workstation keyboard. If the voice mail sender is at a regular external telephone, no user id, node id or description will appear but a notation "External Caller". The IMS could be extended to provide voice recognition capabilities so that the external caller could speak their name into the telephone to be translated into text or a password of regular user might be dialed in from the phone keypad. However, if the telephone was known to the PBX or voice mail system sender information could be provided. Once a mail item has been read or heard, the envelope of each icon will appear ragged, as though it were opened as shown by text mail icon 720. A text buckslip attached to a mail item will indicated by the identifier "(Comment)" 722. A voice buckslip attached to a mail item is designated by the identifier "(Comment)" with a musical note character following. Also, a designated area of a facsimile or other message will be indicated by the identifier "(Passage)" 724.

The action bar 724 contains the actions "File", "View" and "Help" from which pull-down menus containing subactions can be generated. From the view pull-down, the recipient of mail will be able to sort by media type, by date and time and by sender id. A user may wish to view all his office mail first, followed by his voice mail, then his facsimile transmissions and finally image data. Alternatively, he may choose to view by ascending (earliest mail first) or descending (latest mail first) order in which case the office, voice, facsimile and image mail will be mixed. Finally, if the user is searching for all communication from one or more senders, he may search by user id and all mail items of any media type from the sender or senders will be presented in the client area. Also from the view pull-down, the recipient of mail will also be able to limit of filter his mail to certain categories. In addition to filtering his mail by media type, the recipient of mail can filter mail by new, opened, priority and nonpriority categories.

The file pull-down has the following options: open, properties, move, copy, discard, print, send and dial. The send option has subactions; send text, voice, send facsimile, send image. "Open" will open the item selected; "Properties" will display the header information for the mail item selected such as sender, recipients, comments, etc.; "Dial" will autodial the sender of the mail item.

A mail item regardless of media type can be filed or moved from the integrated in-basket to one or more of the recipient's mail or note logs. This is accomplished by copying or moving the pointer information from in-basket to another file.

Figure 13:
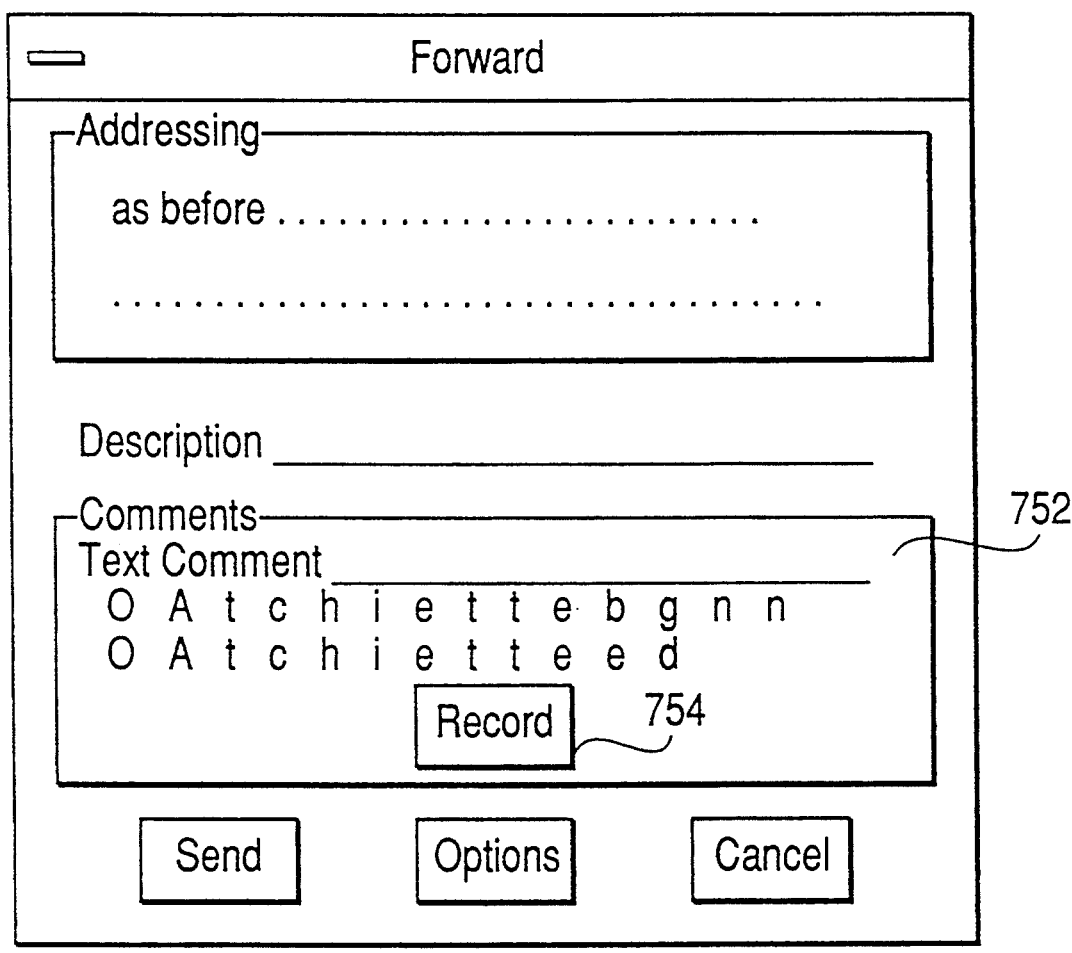
FIG. 13 is the forward panel which is used to forward a message at a computer workstation in the IMS.

A mail item of any media type can also be forwarded to another user of the office system or any media server hooked up to the LAN. This is accomplished by selecting the Send option which is one of the items in the File pull-down menu from the action bar. A second pull-down menu from Send contains Forward action. After selecting Forward, a dialog box 750 will appear as shown in FIG. 13. The user may forward a mail item with either a text comment by typing in the text comment field 752 or a voice comment by selecting the record button 754.

If a voice comment is chosen, a message on the comment line 752 in the Forward dialog box 750 will indicate that a message is being recorded. If the recording was successful, the comment line 752 will indicate that the comment has been recorded. If the recording session was aborted, the comment line will indicate that an error occurred and the message was not saved.

Figure 14:
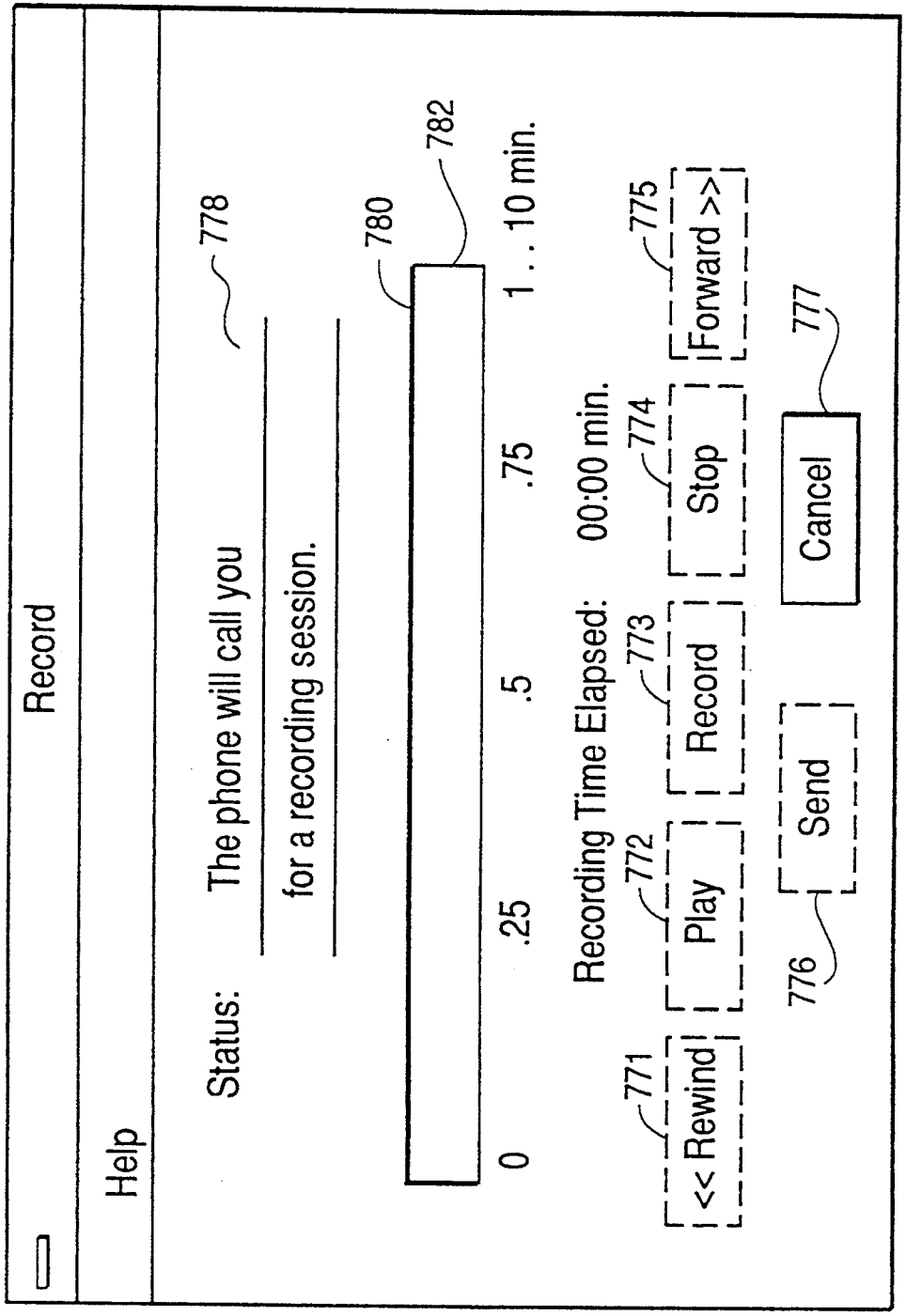
FIG. 14 is the recorder panel which is used to generate a message at a computer workstation in the IMS.

If the record button 754 is selected in the forward dialog box, a dialog box 770 as shown in FIG. 14 will be displayed. A series of buttons 771, 772, 773, 774, 775, 776, 777 with the options Rewind, Play, Record, Stop, Forward, Send and Cancel appear at the bottom of the record dialog box 770. A status line 778 is presented to inform the user the progress of the record session, e.g., whether the VMS will call the user for a recording session, the recording session is in progress, the request to end the recording is being processed and the recording has ended.

A new type of Presentation Manager control, an elapsed time indicator 780, was created for the system. The control graphically displays to the user his position within a voice message. The elapsed time indicator control 780 is utilized in both the recording and playback of a voice message. During a recording, the maximum length 782 of the time bar is equivalent to the maximum length that the VMS will allow for a message. Where a message is played back, the maximum length 782 of the indicator reflects the actual length of the message. During recordings, the indicator 780 is started at a maximum time of one minute. Once the one minute mark is reached, the time indicator flips to the maximum time lay out. Another feature of the indicator 780 is to enable a user to mark a specific section on the time line and re-record the marked part of the message. FIG. 14 shows an example of the EUI Recorder panel containing an elapsed time indicator 780 at its initial state.

Figure 15:
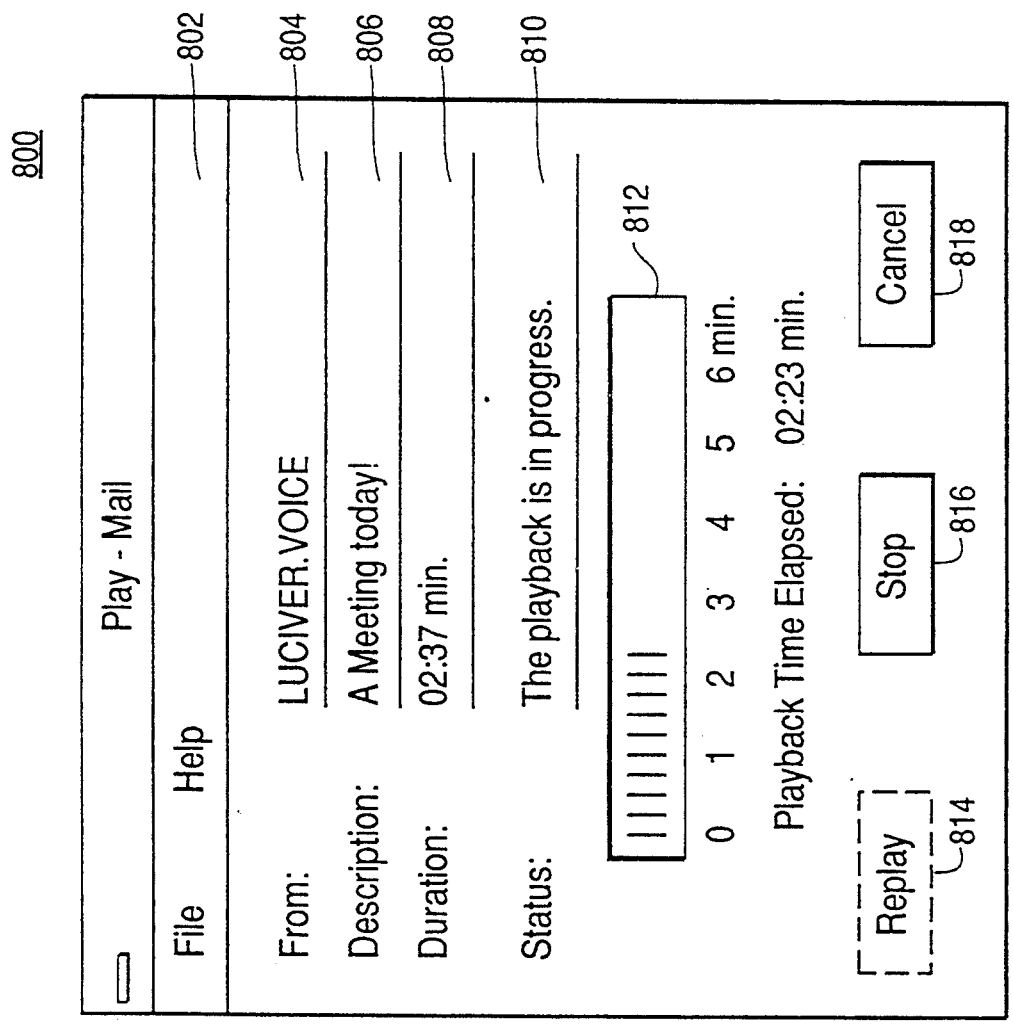
FIG. 15 is the play voice mail panel used to play a voice message at a computer workstation in the IMS.

If a voice mail item has been selected by the recipient from the in-basket window 700 shown in FIG. 12, a Play dialog box 800 as shown in FIG. 15 will be presented by the EUI. A similar dialog box is presented to play a voice comment. The action bar 802 has two options: File and Help. From the File option, a user can select Properties, Move, Discard, Send and Dial options. The Properties option shows a dialog box which informs the user about the characteristics of the message. The Move option allows the user to file the voice message in another mail log. The Send option allows the user to respond to or forward the message. The dialog box also has fields to designate the sender 804, a description of the meeting 806, the duration of the voice message 808, and the status of the playback 810. Also the time indicator 812 similar to that in the record dialog box and FIG. 14 is present. Finally, a series of buttons 814, 816, 818, are available for the user to control playback of the message.

The creator of a mail item can begin the message by selecting the File action from the action bar 724 in the in-basket 700 (see FIG. 12). The Send action is a subaction of File and contains the options Send Text, Send Voice, Send Fax and Send Image. Alternatively, an icon or set of icons can be provided within the EUI which will take the user directly to a message creation session.

If a voice recording session is chosen, the record dialog box 770 as shown in FIG. 14 is presented to the user. The steps for creating a voice message from the workstation are essentially the same as those discussed above in connection with creating a voice comment.

End User Interface Flow Diagrams

Figure 16:
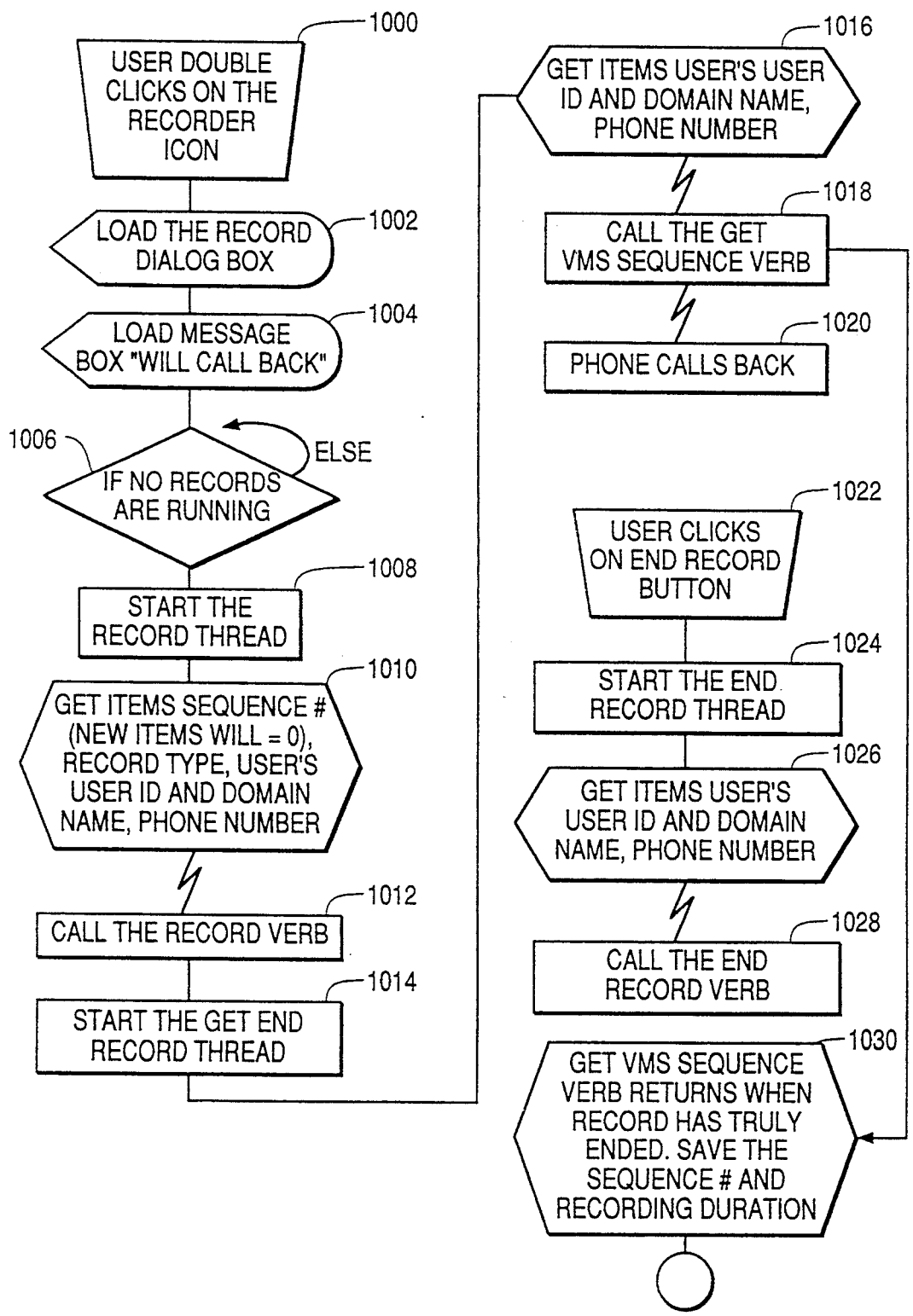
FIG. 16 is a flow diagram of recording a message.
Figure 17:
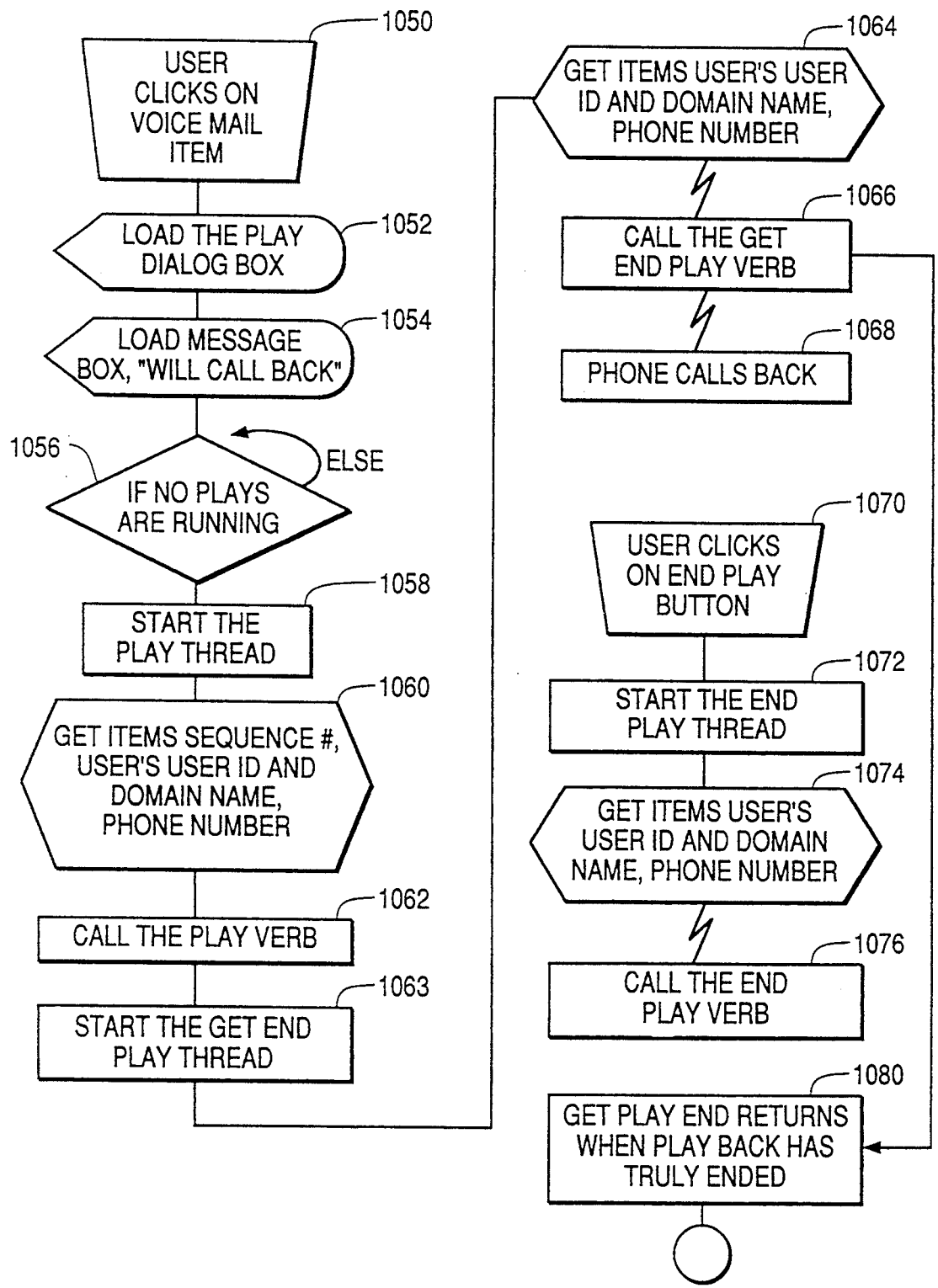
FIG. 17 is a flow diagram of creating an in basket view.

FIGS. 16 depict the flow diagrams for selected procedures in the IMS from the workstation EUI.

As shown in the FIGs., the system takes full advantage of the OS/2 multithreading capability and Presentation Manager's windowing system, giving the user the ability to handle many forms of information simultaneously in a quick and efficient manner. Recording a voice message and reading a mail item can be performed at the same time. The user no longer needs to wait for an application to end, before starting another.

The use of multi-tasking threads allows several tasks to precede concurrently within a given application. Thus, a record request can be issued from a given program and that program can also issue an end recorded request before the record request is ever completed. The request for user ID domain name, etc. is repeated several times in the flow as the usual request has a syntax which requires the user ID to determine who has issued the request.

A thread is an asynchronous flow of logic which is written to perform a given function in a multi-tasking application. It usually runs in parallel to other threads and is usually used for a task which would be considered outside the main flow of logic. Threads can be used to improve perceived end user response time by off loading time sensitive tasks. In the following diagrams, threads are used to build and send each of the requests to the IMS.

FIG. 16 is a flow diagram of recording a voice message from the office workstation. First, in step 1000, the user initiates the recording procedure, either by selecting the recorder icon from the deskstop or by selecting the send voice action from the pulldown on the in-basket. This causes the IMS interface to load the Recorder dialog box to the operating system of the workstation which presents it to user on the workstation display in step 1002. The selection of the recording procedure is a user request which the IMS passes along. While the office workstation is waiting for the VMS to respond, the message "voice mail will call back" is presented on the status line of the recorder box, step 1004.

The workstation checks to see that no other recordings are running in step 1006. If not, the workstation starts the record thread for this voice message, step 1008. If so, the workstation IMS interface continues to check until the other recordings have ended. Next, items such as the message sequence number, the record type, the sender's user id, domain name and phone number are retrieved from the workstation file, in step 1010. The recording takes place in step 1012 when the record verb is called. While the recording is taking place, the IMS interface prepares for the end of the recording by starting the get end record thread, step 1014. In step 1016, the IMS interface looks for items such as user id, domain name and phone number for the get end record thread. In step 1018, the get VMS sequence verb is called. The VMS calls back in step 1020 for the recording. The user is asked to begin talking, once the phone call is answered.

After the recording is finished, the user selects the end record button in the EUI, step 1022. This action starts the end record thread in the workstation in step 1024. The IMS interface retrieves items such as the user's id, domain name and phone number in step 1026 for the end record thread. The end record verb is called in step 1028. Finally, the VMS sequence verb returns when the recording has ended in step 1030. The sequence number and the recording duration are saved as part of the message.

In FIG. 7, the procedure for playing a mail item from the in-basket is shown in a flow diagram. First, in step 1050, the user selects a voice mail item by clicking on the appropriate voice mail icon. The workstation loads the play dialog box in step 1052 and the message "Phone will call back" on the status line in step 1054. The IMS interface then checks whether any other messages are playing in step 1056. If not, the play thread is started in step 1058. If another message is playing, the IMS interface continues to check until it has ended.

Next, items associated with the message such as sequence number, user id, domain name and phone number are retrieved in step 1060 for the Play Thread. The play verb is called in step 1062. Meanwhile, the process for getting the end play thread is initiated in preparation for the end of the message in step 1063. The IMS interface retrieves the items such as user id, domain name and phone number in step 1064 for the extend play thread. In step 1066, the get end play verb is called. The VMS calls back in step 1068 with the message and begins to play.

When the user selects the end play button in step 1070, the end play thread is started by the IMS interface in step 1072. The IMS interface retrieves the items such as user id, domain name and phone number in step 1074 for the end play thread. In step 1076, the end play verb is called. Finally, when the play back of the message has concluded, the get end play verb is returned by the IMS.

Figure 18:
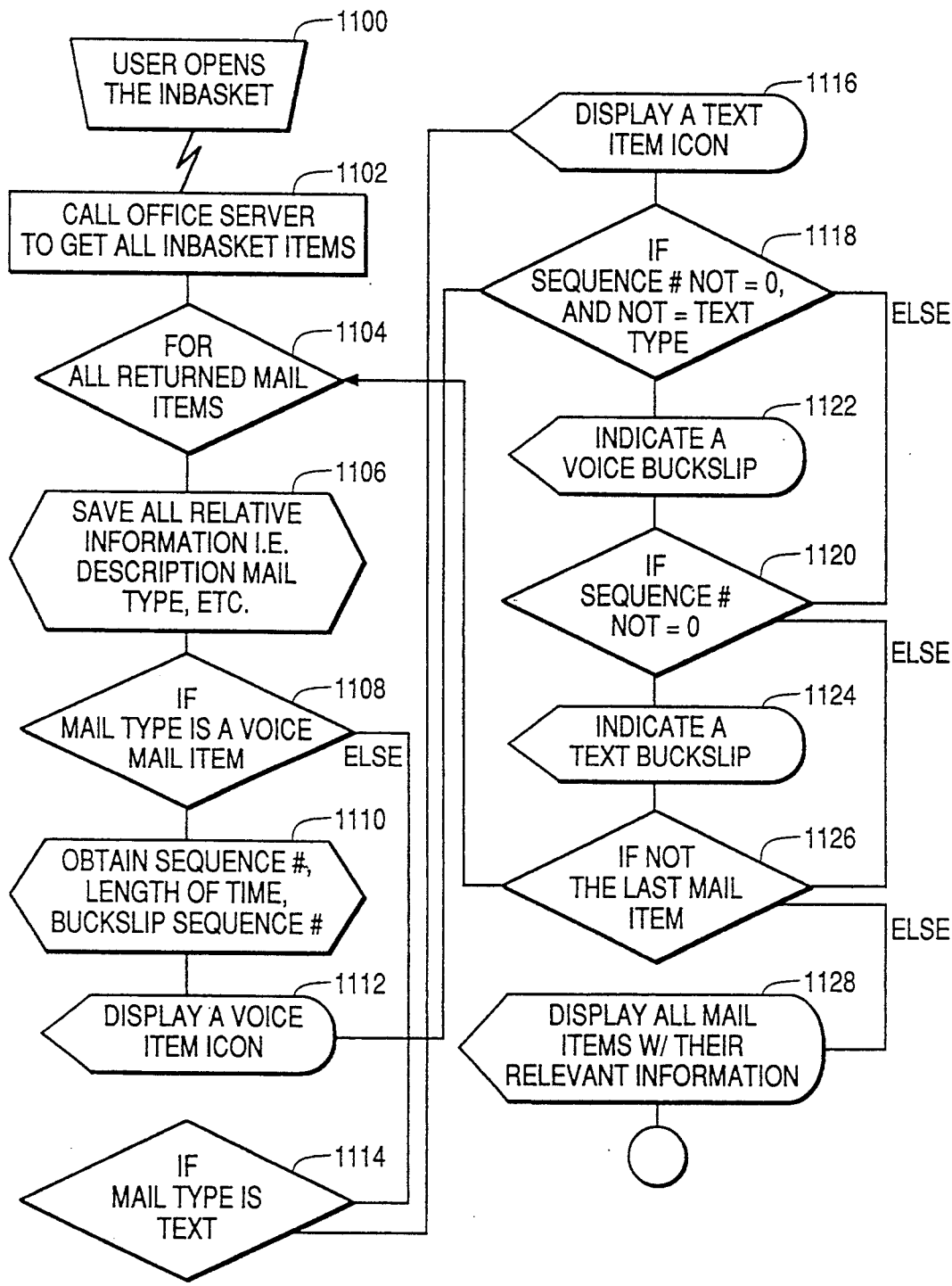
FIG. 18 is a flow diagram of playing a mail item.

FIG. 18 is a flow diagram of creating an in-basket in the workstation EUI which is filled with both voice and text mail. The procedure begins in step 1100 when the user opens the in-basket. This causes the IMS interface to call the office server to get all the mail in-basket items, text, voice, image and facsimile for the recipient step 1102. For all the text mail in-basket items returned (step 1104), the IMS interface saves all the relevant information including mail type, description, etc. in step 1106. Next, a test is performed whether the item is a voice mail item, step 1108. If the mail item is a voice mail item, the sequence number, length of time and buckslip sequence number is retrieved in step 1110 and a voice mail icon is displayed, step 1112. A test is then performed to determine whether the item is a text mail item in step 1114. If so, a text item icon is displayed in the in-basket interface, step 1116. In this diagram, the tests for image or facsimile mail items are omitted.

Next, two tests are performed in steps 1118 and 1120 whether a voice or text buckslip is attached to the mail item. If a voice buckslip is attached, an indication of this fact is noted in the comment line which follows the mail item icon in step 1122. Similarly, if a text buckslip is attached, an indication is noted in the comment line in step 1124. The test for whether there is a designated area in a facsimile or image document is also omitted. Next, the IMS interface determines whether the mail item is the last item in step 1126. If not, the process returns to step 1128 for all remaining items. At the last mail item, the mail items with the appropriate icons and other relevant information are presented to the user in the EUI similar to that depicted in FIG. 12.

Figure 19:
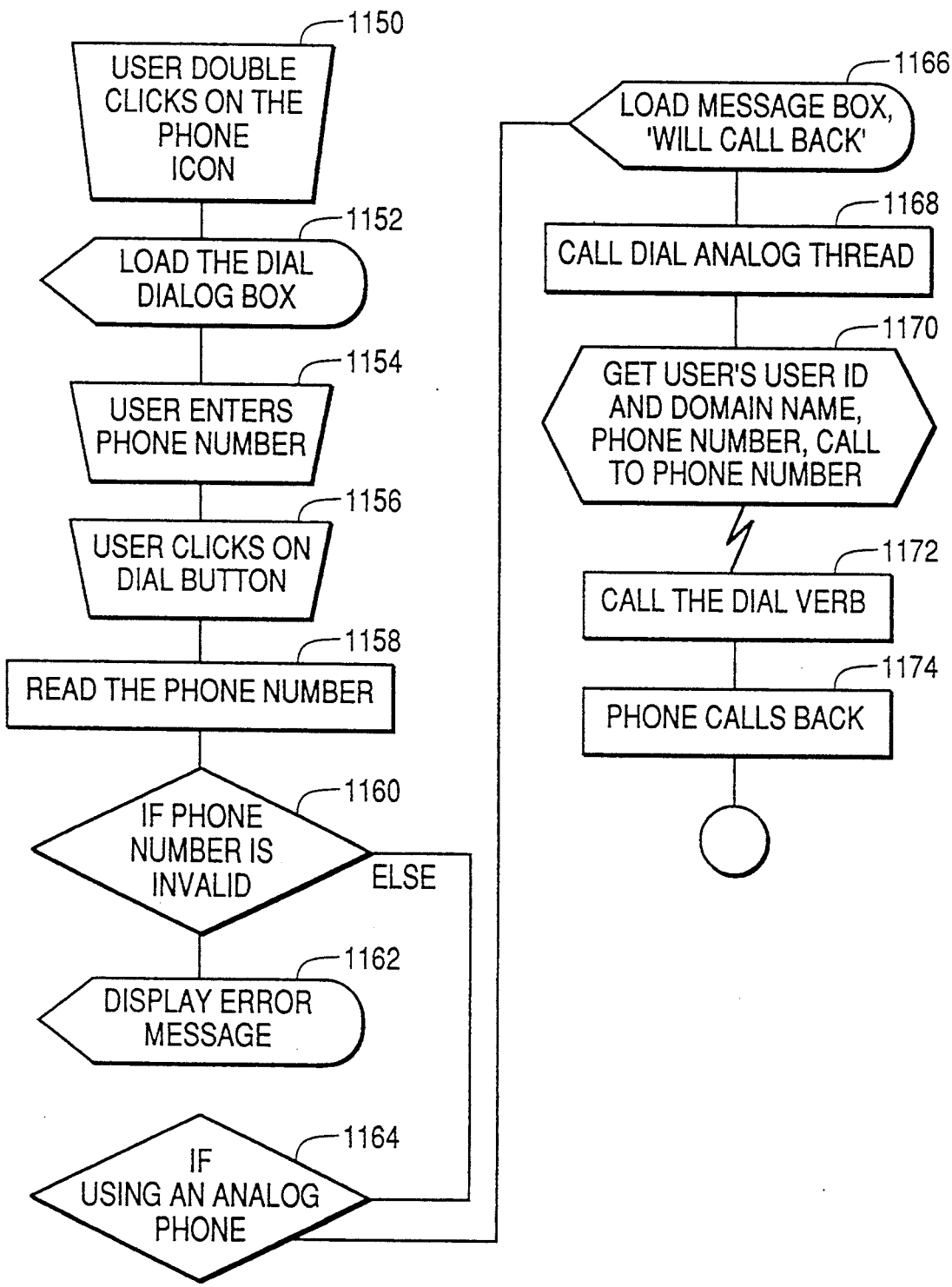
FIG. 19 is a flow diagram of dialing from the phone panel.

In FIG. 19, dialing from the phone panel is shown as a flow diagram. First, the user initiates the process by selecting the phone icon from the deskstop EUI in step 1150. The IMS interface loads the dial dialog box, step 1152. Next, the user enters the recipient's phone number in step 1154 and initiates the dialing procedure by selecting the dial button in the dialog box in step 1156. IMS reads the phone number from the dialog box in step 1158. A check is performed to determine whether the phone number is valid, e.g., numeric characters in phone number rather than other symbols, step 1160. Any characters which do not belong in the phone number are eliminated. If not, an error message is displayed, step 1162.

If the phone number is valid, in step 1164, a test is performed to see if the user has configured his system for an analog phone. This step indicates whether the dialing is to be performed by the VMS rather than hardware resident or attached to the user's machine. This step is only important if the particular VMS included in the IMS uses only analog phones. If so, the IMS loads the message "Phone will call back" in the dialog box in step 1166 and calls the dial analog thread in step 1168. In step 1170, the IMS interface retrieves the user's user id, domain name phone number and the recipient's phone number. Next, in step 1172, the dial verb is called. Finally, the VMS calls back in step 1174.

Telephone User Interface

The telephone user interface is designed to be another entrance point into the Integrated Messaging System. The telephone interface can be more cumbersome to the end user, but it can provide a central access point to messaging for the traveler. The interface is menu driven, through recorded voice prompts, and user input is given though DTMF touch tones, similar to most voice messaging interfaces available today. Through the use of the system protocol, the interface has been enhanced to allow the telephone user access to his E-mail messages, image and facsimile in addition to his traditional voice mail messages. Message information can be reviewed (sender, recipients, date and time sent, message priority, subject, comments), and the message can be acted upon. If the translation capabilities of the IMS are used, the document or portion thereof could be reviewed. Message actions including forwarding, replying, deleting, and archiving will be broadcast to the E-mail, image or facsimile systems. Shared directory information allows the telephone user to access E-mail distribution lists for sending messages, and also broadcasts directory information changes to the E-mail system (such as passwords, sign-out status, outcalling, pager, etc.). A caller could request actions be performed by one of the other servers in the IMS network. For example, he might request that specific facsimile, image or text document be faxed to a remote phone number for review.

TABLE 1

REQUESTS FROM OFFICE (IMAGE OR FACSIMILE) SYSTEM FOR VOICE SYSTEM AND VOICE SYSTEM RESPONSE –

ACKCREATEV and ACKCREATEVR

Create an acknowlegement or undelivered log entry in the voice system. For text messages, only TSSEQUENCE will used. For voice messages, TSSEQUENCE and VSSEQUENCE will be used.
Office
ACKCREATEV (VSUSERID_sender, VSNODE_sender, TSSEQUENCE, VSSEQUENCE, ACKACTION, SUBJECT, DATE_submitted, TIME_submitted, VSRECIPLIST
Voice
ACKCREATEVR (VSUSERID_sender, VSNODE_sender, TSSEQUENCE, VSSEQUENCE, ERRCODE)

ACKUPDATEV and ACKUPDATEVR

Update/Delete an acknowlegement log entry in the voice system. For text messages, only TSSEQUENCE will be used. For voice messages, TSSEQUENCE and VSSEQUENCE will be used.
Office
ACKUPDATEV (VSUSERID_sender, VSNODE_sender, TSSEQUENCE, VSSEQUENCE, ACKACTION, VSUSERID_recip, VSNODE_recip)
Voice
ACKUPDATEVR (VSUSERID_sender, VSNODE_sender, TSSEQUENCE, VSSEQUENCE, ERRCODE)

TABLE 1-continued
REQUESTS FROM OFFICE (IMAGE OR FACSIMILE) SYSTEM FOR VOICE SYSTEM AND VOICE SYSTEM RESPONSE --

CTHEADER and CTHEADERR
Office system creates a text note header in the voice system
in-basket.
Office
CTHEADER (VSUSERID_receiver, VSNODE_receiver, TCOUNT, REFRESHFLAG,
 ARCHIVENAME, TSHEADER)
Voice
CTHEADERR (VSUSERID_receiver, VSNODE_receiver, REFRESHFLAG,
 ERRCODE, TSSEQUENCE)
(See CVHEADER and CVHEADERR in TABLE 2 for voice analogue)
DELETEVOICE and DELETEVOICER
Office user requests that the voice system delete a voice
message.
Office
DELETEVOICE (VSUSERID, VSNODE, VSSEQUENCE)
Voice
DELETEVOICER (VSUSERID, VSNODE, ERRCODE, VSSEQUENCE)
DIAL and DIALR
Office user requests that the voice system dial a number.
The voice system rings both phones and connects.
Office
DIAL (VSUSERID, VSNODE, SESSIONPHONE, CALLTOPHONE)
Voice
DIALR (VSUSERID, VSNODE, SESSIONPHONE, ERRCODE)
DTHEADER and DTHEADERR
Office user deletes a text note.
Office
DTHEADER (VSUSERID, VSNODE, TSSEQUENCE)
Voice
DTHEADERR (VSUSERID, VSNODE, ERRCODE, TSSEQUENCE)
(See DVHEADER and DVHEADERR for voice analogue)
ENDPLAY and ENDPLAYR
Office user tells the voice system to stop playing of a
voice message.
Office
ENDPLAY (VSUSERID, VSNODE, SESSIONPHONE)
Voice
ENDPLAYR (VSUSERID, VSNODE, SESSIONPHONE, ERRCODE)
ENDRECORD and ENDRECORDR
Office user tells the voice system to stop recording of a
voice message.
Office
ENDRECORD (VSUSERID, VSNODE, DELETEFLAG, SESSIONPHONE)
Voice
ENDRECORDR (VSUSERID, VSNODE, SESSIONPHONE, ERRCODE)
LISTVOICE and LISTVOICER
Office user requests the voice system to identify each of
his voice messages.
Office
LISTVOICE (VSUSERID, VSNODE, FILTER, SENDFLAG, ARCHIVENAME)
Voice
LISTVOICER (VSUSERID, VSNODE, FILTER, VCOUNT, ARCHIVENAME,
 ERRCODE)
GETVOICE and GETVOICER
Office system requests the voice system to provide a voice
body for a given VSSEQUENCE.
Office
GETVOICE (VSUSERID, VSNODE, VSSEQUENCE, MAXBYTES, OFFSET)
Voice
GETVOICER (VSUSERID, VSNODE, ERRCODE, VSSEQUENCE, TEXT)
PLAY and PLAYR
Office user requests to listen to a voice message.
Office
PLAY (VSUSERID, VSNODE, SESSIONPHONE, PLAYACTION,
 VSSEQUENCE)
Voice
PLAYR (VSUSERID, VSNODE, SESSIONPHONE, ERRCODE, VSSEQUENCE)
(See PLAYCOMPLETE and PLAYCOMPLETER in TABLE 2)
NEWVOICE and NEWVOICER
Indicate to the voice system that a voice message was
received and provide the necessary TSSEQUENCE which was
assigned.
Office

TABLE 1-continued
REQUESTS FROM OFFICE (IMAGE OR FACSIMILE) SYSTEM FOR VOICE SYSTEM AND VOICE SYSTEM RESPONSE NEWVOICE (VSUSERID_recip, VSNODE_recip, TSSEQUENCE, VSSEQUENCE)
Voice
NEWVOICER (VSUSERID_recip, VSNODE_recip, TSSEQUENCE, VSSEQUENCE, ERRCODE)
QUERYVSTATUS and QUERYVSTATUSR Office system queries the status of the voice system user.
Office
QUERYVSTATUS (VSUSERID, VSNODE, SESSIONPHONE)
Voice
QUERYVSTATUSR (VSUSERID, VSNODE, SESSIONPHONE, ERRCODE)
RECORD and RECORDR Office user requests to record a voice message.
Office
RECORD (VSUSERID, VSNODE, SESSIONPHONE, RECORDTYPE, VSSEQUENCE)
Voice
RECORDR (VSUSERID, VSNODE, SESSIONPHONE, ERRCODE)
(See RECORDCOMPLETE and RECORDCOMPLER in TABLE 2)
SAVEVOICE and SAVEVOICER Office user requests that the voice system save a voice
message.
Office
SAVEVOICE (VSUSERID, VSNODE, ARCHIVENAME, DOCTYPE, VSSEQUENCE, TSSEQUENCE)
Voice
SAVEVOICER (VSUSERID, VSNODE, ERRCODE, VSSEQUENCE, TSSEQUENCE)
SENDVOICE and SENDVOICER Office user requests that the voice system send a voice
message.
Office
SENDVOICE (VSUSERID_sender, VSNODE_sender, VSSEQUENCE_old,
    TSSEQUENCE, TVMSGID, TMSG, SUBJECT, SENDTYPE,
    DELIVERYFLAGS, DELIVERYDATE, DELIVERYTIME,
    ARCHIVENAME, VSUSERLIST_receivers)
Voice
SENDVOICER (VSUSERID_sender, VSNODE_sender, ERRCODE,
    VSSEQUENCE_new, TSSEQUENCE, ARCHIVENAME,
    BAD_VSUSERLISTR_receivers
TSERVER anD TSERVERR Used to notify the voice system that the Office system is
either in a state of initializing or terminating, or to request
that the voice system should terminate.
Office
TSERVER (ACTION)
Voice
TSERVERR (ACTION, ERRCODE)
TSTATUS and TSTATUSR Office user gives status to the voice system.
Office
TSTATUS (VSUSERID, VSNODE, USERACTION)
Voice
TSTATUSR (VSUSERID, VSNODE, USERACTION, ERRCODE)
UPDATEVOICE and UPDATEVOICER Office requests the voice system to change the status of a
voice message.
Office
UPDATEVOICE (VSUSERID, VSNODE, VSSEQUENCE, TSSEQUENCE, STATUS)
Voice
UPDATEVOICER (VSUSERID, VSNODE, ERRCODE, VSSEQUENCE, TSSEQUENCE)
VDIRECTORY and VDIRECTORYR This is a generic directory request of the voice system to
query, update, create or delete an entry in a voice directory.
Office user requests that the voice system obtain or update his
voice profile. Office Administrator requests voice system to
create, obtain, update, or delete a voice system entry.
Office
VDIRECTORY (VSUSERID, VSNODE, ACTIONPARM, BUFFER)
Voice
VDIRECTORYR (VSUSERID, VSNODE, ERRCODE, NUMREC, BUFFER)
VDISTLIST and VDISTLISTR Office user requests that the voice system return a voice
distribution list or update a voice distribution list.
Office
VDISTLIST (VSUSERID_requestor, VSNODE_requestor, PROFILEACTION,

TABLE 1-continued
REQUESTS FROM OFFICE (IMAGE OR FACSIMILE) SYSTEM FOR VOICE SYSTEM AND VOICE SYSTEM RESPONSE –

DISTLISTNAME, NUMREC, DISTLIST_entries)
Voice
VDISTLISTR (VSUSERID, VSNODE, ERRCODE, NUMREC, DISTLIST_names
    DISTLIST_entries, BAD_VSUSERLIST_entries)

TABLE 2
REQUESTS FROM VOICE (IMAGE OR FACSIMILIE) SYSTEM TO THE OFFICE SYSTEM AND OFFICE SYSTEM RESPONSE PLUS CALENDAR AND DIRECTORY

ACKCREATET and ACKCREATETR

Create an acknowlegement or udelivered log entry in the
Office system.
Voice
ACKCREATET (TSUSERD_sender, TSNODE_sender, TSSEQUENCE,
    VSSEQUENCE, ACKACTION, SUBJCET, DATE_submitted,
    TIME_submitted, TSRECIPLIST)
Office
ACKCREATETR (TSUSERID_sender, TSNODE_sender, TSSEQUENCE,
    VSSEQUENCE, ERRCODE)
ACKUPDATET and ACKUPDATETR Update/Delete an acknowlegement log entry in the Office
system.
Voice
ACKUPDATET (TSUSERID_sender, TSNODE_sender, TSSEQUENCE,
    VSSEQUENCE, ACKACTION, TSUSERID_recip,
    TSNODE_recip)
Office
ACKUPDATETR (TSUSERID_sender, TSNODE_sender, TSSEQUENCE,
    VSSEQUENCE, ERRCODE)
CALENDARQUERY and CALENDARQUERYR VSUSERID and VSNODE refer to the user at the telephone.
Requires VSUSERID and VSNODE to return response.
Voice
CALENDARQUERY (TSUSERID, TSNODE, DATE, STARTTIME, STOPTIME,
    CALENDARITEM)
Office
CALENDARQUERYR (TSUSERID, TSNODE, DATE, STARTTIME, STOPTIME,
    CALENDARITEM, TEXT, ERRCODE)
CVHEADER and CVHEADERR Voice system delivers a voice note header to an Office
in-basket.
Voice
CVHEADER (TSUSERID, TSNODE, VCOUNT, TSUSERIDn, TSNODEn, VCOUNTn,
    REFESHFLAG, ARCHIVENAME, VSHEADER)
Office
CVHEADERR (ERRCODE, VSSEQUENCE, TSSEQUENCE)
DELETETEXT annd DELETETEXTR The voice system will delete the message before sending
DELETETEXT to the Office system.
Voice
DELETETEXT (TSUSERID, TSNODE, TSSEQUENCE)
Office
DELETETEXTR (TSUSERID, TSNODE, ERRCODE, TSSEQUENCE)
DVHEADER and DVHEADERR Voice system deletes a voice header from an Office
in-basket.
Voice
DVHEADER (TSUSERID, TSNODE, ARCHIVENAME, TSSEQUENCE)
Office
DVHEADERR (TSUSERID, TSNODE, ERRCODE, TSSEQUENCE)
GETTEXT and GETTEXTR Voice system request the Office system to provide a text
body for a given TSSEQUENCE.
Voice
GETTEXT (TSUSERID, TSNODE, TSSEQUENCE, MAXSIZE, OFFSET)
Office
GETTEXTR (TSUSERID, TSNODE, ERRCODE, TSSEQUENCE, TEXT)
LISTTEXT and LISTTEXTR Voice user requests the Office system to identify each of
his text notes.
Voice
LISTTEXT (TSUSERID, TSNODE, FILTER, SENDFLAG, ARCHIVENAME)

TABLE 2-continued
REQUESTS FROM VOICE (IMAGE OR FACSIMILIE) SYSTEM TO THE OFFICE SYSTEM AND OFFICE SYSTEM RESPONSE PLUS CALENDAR AND DIRECTORY Office
LISTTEXTR (TSUSERID, TSNODE, FILTER, TCOUNT, ARCHIVENAME, ERRCODE)
PLAYCOMPLETE and PLAYCOMPLETER
Voice system tells the Office user that the playing of the voice message has completed.
Voice
PLAYCOMPLETE (TSUSERID, TSNODE, SESSIONPHONE, ERRCODE, VSSEQUENCE)
Office
PLAYCOMPLETER (TSUSERID, TSNODE, SESSIONPHONE, VSSEQUENCE)
RECORDCOMPLETE and RECORDCOMPLETER
Voice system tells the Office user that the record of the voice message has completed.
Voice
RECORDCOMPLETE (TSUSERID, TSNODE, SESSIONPHONE, ERRCODE, VSSEQUENCE, VSMSGLENGTH, VSMSGDURATION)
Office
RECORDCOMPLETER (TSUSERID, TSNODE, SESSIONPHONE, VSSEQUENCE)
SAVETEXT and SAVETEXTR
Voice user requests that the Office system save a voice or text message.
Voice
SAVETEXT (TSUSERID, TSNODE, ARCHIVENAME, DOCTYPE, VSSEQUENCE, TSSEQUENCE)
Office
SAVETEXTR (TSUSERID, TSNODE, ERRCODE, VSSEQUENCE, TSSEQUENCE)
SENDTEXT and SENDTEXTR
SENDTYPE of note, reply, forward (w or w/o buckslip).
Voice
SENDTEXT (TSUSERID, TSNODE, TSSEQUENCE, TVMSGID, TMSG, SUBJECT, SENDTYPE, DELIVERYFLAGS, TSUSERLIST_receivers)
Office
SENDTEXTR (TSUSERID, TSNODE, ERRCODE, TSSEQUENCE, BAD_TSUSERLISTR_receivers)
TDIRECTORY and TDIRECTORYR
This is a generic directory request of the Office system to query, update, create or delete an entry in a Office directory. Voice user requests that the Office system obtain or update his voice profile. Voice Administrator requests Office system to create, obtain, update, or delete an Office system entry.
Voice
TDIRECTORY (TSUSERID, TSNODE, ACTIONPARM, BUFFER)
Office
TDIRECTORYR (TSUSERID, TSNODE, ERRCODE, NUMREC, BUFFER)
TDISTLIST and TDISLISTR
Voice user requests that the Office system provide a list of all Office distribution lists available or the contents of a specific Office distribution list.
Voice
TDISTLIST (TSUSERID_requestor, TSNODE_requestor, PROFILEACTION, DISTLISTNAME, NUMREC, DISTLIST_entries)
Office
TDISTLISTR (TSUSERID, TSNODE, ERRCODE, NUMREC, DISTLISTNAME, DISTLIST entries)
QUERYTSTATUS and QUERYTSTATUSR
Voice system queries the status of the Office system user.
Voice
QUERYTSTATUS (TSUSERID, TSNODE)
Office
QUERYTSTATUSR (TSUSERID, TSNODE, ERRCODE)
UPDATETEXT and UPDATETEXTR
Voice system requests the Office system to change the status of an Office note.
Voice
UPDATETEXT (TSUSERID, TSNODE, TSSEQUENCE, VSSEQUENCE, STATUS)
Office
UPDATETEXTR (TSUSERID, TSNODE, ERRCODE, TSSEQUENCE, VSSEQUENCE)
VOICESENT and VOICESENTR
Voice system indicates to the Office system that the user has sent the recorded voice message from the phone keypad instead of the (expected) workstation keyboard.
Voice

TABLE 2-continued

REQUESTS FROM VOICE (IMAGE OR FACSIMILIE) SYSTEM TO THE OFFICE SYSTEM AND OFFICE SYSTEM RESPONSE PLUS CALENDAR AND DIRECTORY

VOICESENT (TSUSERID—sender, TSNODE—sender, VSSEQUENCE)
Office
VOICESENTR (TSUSERID—sender, TSNODE—sender)
VSERVER and VSERVERR Used to notify the Office system that the voice system is either in a state of initializing or terminating, or to request that the Office system should terminate
Voice
VSERVER (ACTION)
Office
VSERVERR (ACTION, ERRCODE)
VSTATUS and VSTATUSR Voice system user gives its status to the Office system.
Voice
VSTATUS (TSUSERID, TSNODE, USERACTION)
Office
VSTATUSR (TSUSERID, TSNODE, USERACTION, ERRCODE)

TABLE 3

REQUESTS FROM OFFICE (IMAGE OR FACSIMILE) SYSTEM FOR IMAGE SYSTEM AND IMAGE SYSTEM RESPONSE --

ACKCREATEI and ACKCREATEIR

Create an acknowlegement or undelivered log entry in the voice system. For text messages, only TSSEQUENCE will be used. For voice messages, TSSEQUENCE and VSSEQUENCE will be used. For image messages, TSSEQUENCE and ISSEQUENCE will be used.
Office
ACKCREATEI (ISUSERID—sender, ISNODE—sender, TSSEQUENCE,
    ISSEQUENCE, ACKACTION, SUBJECT, DATE—submitted,
    TIME—submitted, ISRECIPLIST)
Image
ACKCREATEIR (ISUSERID—sender, ISNODE—sender, TSSEQUENCE,
    ISSEQUENCE, ERRCODE)
ACKUPDATEI and ACKUPDATEIR Update/Delete an acknowlegement log entry in the image system. For text messages, only TSSEQUENCE will be used. For voice messages, TSSEQUENCE and VSSEQUENCE will used. For image messages, ISSEQUENCE and ISSEQUENCE will be used.
Office
ACKUPDATEI (ISUSERID—sender, ISNODE—sender, TSSEQUENCE,
    ISSEQUENCE, ACKACTION, ISUSERID—recip, ISNODE—recip)
Image
ACKUPDATEIR (ISUSERID—sender, ISNODE—sender, TSSEQUENCE,
    ISSEQUENCE, ERRCODE)
CIHEADER and CIHEADERR Office system creates a text note header in the image system in-basket.
Office
CIHEADER (ISUSERID—receiver, ISNODE—receiver, TCOUNT, REFRESHFLAG,
    ARCHIVENAME, TSHEADER)
Image
CIHEADERR (ISUSERID—receiver, ISNODE—receiver, REFRESFLAG,
    ERRCODE, TSSEQUENCE)
DELETEIMAGE and DELETEIMAGER Office user requests that the image system delete a image message.
Office
DELETEIMAGE (ISUSERID, ISNODE, ISSEQUENCE)
Image
DELETEIMAGER (ISUSERID, ISNODE, ERRCODE, ISSEQUENCE)
FAX and FAXR Office user requests that the facsimile system send a facsimile. The facsimile system rings both phones and connects.
Office
FAX (FSUSERID, FSNODE, SESSIONPHONE, CALLTOPHONE)
Voice
FAXR (FSUSERID, FSNODE, SESSIONPHONE, ERRCODE)
LISTIMAGE and LISTIMAGER Office user requests the image system to identify each of his image messages.
Office
LISTIMAGE (ISUSERID, ISNODE, FILTER, SENDFLAG, ARCHIVENAME)

TABLE 3-continued

REQUESTS FROM OFFICE (IMAGE OR FACSIMILE) SYSTEM FOR IMAGE SYSTEM AND IMAGE SYSTEM RESPONSE --

Image
LISTIMAGER (ISUSERID, ISNODE, FILTER, VCOUNT, ARCHIVENAME,
    ERRCODE)
GETIMAGE and GETIMAGER Office system requests the image system to provide a image body
for a given ISSEQUENCE.
Office
GETIMAGE (ISUSERID, ISNODE, ISSEQUENCE, MAXBYTES, OFFSET)
Image
GETIMAGER (ISUSERID, ISNODE, ERRCODE, ISSEQUENCE, TEXT)
IMAGE and IMAGER Office user requests to see an image message.
Office
IMAGE (ISUSERID, ISNODE, SESSIONPHONE, IMAGEACTION,
    ISSEQUENCE)
Image
IMAGER (ISUSERID, ISNODE, SESSIONPHONE, ERRCODE, ISSEQUENCE)
(See IMAGECOMPLETE and IMAGECOMLPLETER in TABLE 2)
NEWIMAGE and NEWIMAGER Indicate to the image system that a image message was received,
and provide the necessary TSSEQUENCE which was assigned.
Office
NEWIMAGE (ISUSERID_recip, ISNODE_recip, TSSEQUENCE, ISSEQUENCE)
Image
NEWIMAGER (ISUSERID_recip, ISNODE_recip, TSSEQUENCE, ISSEQUENCE,
    ERRCODE)
QUERYISTATUS and QUERYISTATUSR Office system queries the status of the image system user.
Office
QUERYISTATUS (ISUSERID, ISNODE, SESSIONPHONE)
Image
QUERYISTATUSR (ISUSERID, ISNODE, SESSIONPHONE, ERRCODE)
RECORDIMAGE and RECORDIMAGER Office user requests to record a image message.
Office
RECORD (ISUSERID, ISNODE, SESSIONPHONE, RECORDTYPE, ISSEQUENCE)
Image
RECORDR (ISUSERID, ISNODE, SESSIONPHONE, ERRCODE)
SAVEIMAGE and SAVEIMAGER Office user requests that the image system save a image message.
Office
SAVEIMAGE (ISUSERID, ISNODE, ARCHIVENAME, DOCTYPE, ISSEQUENCE,
    TSSEQUENCE)
Image
SAVEIMAGER (ISUSERID, ISNODE, ERRCODE, ISSEQUENCE, TSSEQUENCE)
SENDIMAGE and SENDIMAGER Office user requests that the image system send a image message.
Office
SENDIMAGE (ISUSERID_sender, ISNODE_sender, ISSEQUENCE_old,
    TSSEQUENCE, TVMSGID, TMSG, SUBJECT, SENDTYPE,
    DELIVERYFLAGS, DELIVERYDATE, DELIVERYTIME,
    ARCHIVENAME, ISUSERLIST_receivers)
Image
SENDIMAGER (ISUSERID_sender, ISNODE_sender, ERRCODE,
    ISSEQUENCE_new, TSSEQUENCE, ARCHIVENAME,
    BAD_ISUSERLISTR_receivers)
UPDATIMAGE and UPDATEIMAGER Office requests the image system to change the status of a
image message.
Office
UPDATEIMAGE (ISUSERID, ISNODE, ISSEQUENCE, TSSEQUENCE, STATUS)
Image
UPDATEIMAGER (ISUSERID, ISNODE, ERRCODE, ISSEQUENCE, TSSEQUENCE)
IDIRECTORY and IDIRECTORYR This is a generic directory request of the image system to
query, update, create or delete an entry in a image directory.
Office user requests that the image system obtain or update his
image profile. Office Administrator requests image system to
create, obtain, update, or delete a image system entry.
Office
VDIRECTORY (ISUSERID, ISNODE, ACTIONPARM, BUFFER)
Image
VDIRECTORYR (ISUSERID, ISNODE, ERRCODE, NUMREC, BUFFER)

TABLE 3-continued
REQUESTS FROM OFFICE (IMAGE OR FACSIMILE) SYSTEM FOR IMAGE SYSTEM AND IMAGE SYSTEM RESPONSE --

IDISTLIST and IDISTLISTR

Office user requests that the image system return a image
distribution list or update a image distribution list.
Office
VDISTLIST (ISUSERID_requestor, ISNODE_requestor, PROFILEACTION,
 DISTLISTNAME, NUMREC, DISTLIST_entries)
Image
VDISTLISTR (ISUSERID, ISNODE, ERRCODE, NMEC, DISLIST_names
 DISTLIST_entries, BAD_ISUSERLIST_entries)

TABLE 4
REQUESTS FROM OFFICE (IMAGE OR FACSIMILE) SYSTEM FOR FACSIMILE SYSTEM AND FACSIMILE SYSTEM RESPONSE --

ACKCREATEF and ACKCREATEFR

Create an acknowlegement or undelivered log entry in the
voice system. For text messages, only TSSEQUENCE will be used.
For voice messages, TSSEQUENCE and VSSEQUENCE will be used. For
facsimile messages, TSSEQUENCE and FSSEQUENCE will be used.
Office
ACKCREATEF (FSUSERID_sender, FSNODE_sender, TSSEQUENCE,
 FSSEQUENCE, ACKACTION, SUBJECT, DATE_submitted,
 TIME_submitted, FSRECIPLIST)
Facsimile
ACKCREATEFr (FSUSERID_sender, FSNODE_sender, TSSEQUENCE,
 FSSEQUENCE, ERRCODE)
ACKUPDATEF and ACKUPDATEFR Update/Delete an acknowlegement log entry in the facsimile
system. For text messages, only TSSEQUENCE will be used. For
voice messages, TSSEQUENCE an VSSEQUENCE will be used. For
facsimile messages, FSSEQUENCE and FSSEQUENCE will be used.
Office
ACKUPDATEF (FSUSERID_sender, FSNODE_sender, TSSEQUENCE,
 FSSEQUENCE, ACKACTION, FSUSERID_recip, FSNODE_recip)
Facsimile
ACKUPDATEFR (FSUSERID_sender, FSNODE_sender, TSSEQUENCE,
 FSSEQUENCE, ERRCODE)
CFHEADER and CFHEADERR Office system creates a text note header in the facsimile
system in-basket.
Office
CFHEADER (FSUSERID_receiver, FSNODE_receiver, TCOUNT,
 REFRESHFLAG, ARCHIVENAME, TSHEADER)
Facsimile
CFHEADERR (FSUSERID_receiver, FSNODE_receiver, REFRESFLAG,
 ERRCODE, TSSEQUENCE)
DELETEFAX and DELETEFAXR Office user requests that the facsimile system delete a
facsimile message.
Office
DELETEFAX (FSUSERID, FSNODE, FSSEQUENCE)
Facsimile
DELETEFAXR (FSUSERID, FSNODE, ERRCODE, FSSEQUENCE)
DIALFAX and DIALFAXR Office user requests that the facsimile system send a
facsimile. The facsimile system rings both phones and connects.
Office
FAX (FSUSERID, FSNODE, SESSIONPHONE, CALLTOPHONE)
Facsimile
FAXR (FSUSERID, FSNODE, SESSIONPHONE, ERRCODE)
LISTFAX and LISTFAXR Office user requests the facsimile system to identify each
of his facsimile messages.
Office
LISTFAX (FSUSERID, FSNODE, FILTER, SENDFLAG, ARCHIVENAME)
Facsimile
LISTFAXR (FSUSERID, FSNODE, FILTER, VCOUNT, ARCHIVENAME,
 ERRCODE)
GETFAX and GETFAXR Office system requests the facsimile system to provide a
facsimile body for a given FSSEQUENCE.
Office
GETFAX (FSUSERID, FSNODE, FSSEQUENCE, MAXBYTES, OFFSET)

TABLE 4-continued

REQUESTS FROM OFFICE (IMAGE OR FACSIMILE) SYSTEM FOR FACSIMILE SYSTEM AND FACSIMILE SYSTEM RESPONSE

Facsimile
GETFAXR (FSUSERID, FSNODE, ERRCODE, FSSEQUENCE, TEXT)
FAX and FAXR
Office user requests to see to an facsimile message.
Office
FAX (FSUSERID, FSNODE, SESSIONPHONE, FAXACTION,
    FSSEQUENCE)
Voice
FAXR (FSUSERID, FSNODE, SESSIONPHONE, ERRCODE, FSSEQUENCE)
(See FAXCOMPLETE and FAXCOMPLETER in TABLE 2)
NEWFAX an NEWFAXR
Indicate to the facsimile system that a facsimile message
was received, and provide the necessary TSSEQUENCE which was
assigned.
Office
NEWFAX (FSUSERID_recip, FSNODE_recip, TSSEQUENCE, FSSEQUENCE)
Facsimile
NEWFAXR (FSUSERID_recip, FSNODE_recip, TSSEQUENCE, FSSEQUENCE,
    ERRCODE)
QUERYFSTATUS and QUEYFSTATUSR
Office system queries the status of the facsimile system
user.
Office
QUERYFSTATUS (FSUSERID, FSNODE, SESSIONPHONE)
Facsimile
QUERYFSTATUSR (FSUSERID, FSNODE, SESIONPHONE, ERRCODE)
RECORDFAX and RECORDFAXR
Office user requests to record a facsimile message.
Office
RECORD (FSUSERID, FSNODE, SESSIONPHONE, RECORDTYPE, FSSEQUENCE)
Facsimile
RECORDR (FSUSERID, FSNODE, SESSIONPHONE, ERRCODE)
(See RECORDCOMPLETE and RECODRCOMPLER in TABLE 2)
SAVEFAX and SAVEFAXR
Office user requests that the facsimile system save a
facsimile message.
Office
SAVEFAX (FSUSERID, FSNODE, ARCHIVENAME, DOCTYPE, FSSEQUENCE,
    TSSEQUENCE)
Facsimile
SAVEFAXR (FSUSERID, FSNODE, ERRCODE, FSSEQUENCE, TSSEQUENCE)
SENDFAX and SENDFAXR
Office user requests that the facsimile system send a
facsimile message.
Office
SENDFAX (FSUSERID_sender, FSNODE_sender, FSSEQUENCE_old,
    TSSEQUENCE, TVMSGID, TMSG, SUBJECT, SENDTYPE,
    DELIVERYFLAGS, DELIVERYDATE, DELIVERYTIME,
    ARCHIVENAME, FSUSERLIST_receivers)
Facsimile
SENDFAXR (FSUSERID_sender, FSNODE_sender, ERRCODE,
    FSSEQUENCE_new, TSSEQUENCE, ARCHIVENAME,
    BAD_FSUSERLISTR_receivers)
UPDATEFAX an UPDATEFAXR
Office requests the facsimile system to change the status of
a facsimile message.
Office
UPDATEFAX (FSUSERID, FSNODE, FSSEQUENCE, TSSEQUENCE, STATUS)
Voice
UPDATEFAXR (FSUSERID, FSNODE, ERRCODE, FSSEQUENCE, TSSEQUENCE)
FDIRECTORY and FDIRECTORYR
This is a generic directory request of the facsimile system
to query, update, create or delete an entry in a facsimile
directory. Office user requests that the facsimile system obtain
or update his voice profile. Office Administrator requests
facsimile system to create, obtain, update, or delete a facsimile
system entry.
Office
FDIRECTORY (FSUSERID, FSNODE, ACTIONPARM, BUFFER)
Voice
FDIRECTORYR (FSUSERID, FSNODE, ERRCODE, NUMREC, BUFFER)
FDISTLIST and FDISTLISTR
Office user requests that the facsimile system return a

TABLE 4-continued

REQUESTS FROM OFFICE (IMAGE OR FACSIMILE) SYSTEM FOR FACSIMILE SYSTEM AND FACSIMILE SYSTEM RESPONSE -- facsimile distribution list or update a facsimile distribution list.
Office
FDISTLIST (FSUSERID_requestor, FSNODE_requestor, PROFILEACTION, DISTLISTNAME, NUMREC, DISLIST_entries)
Facsimile
FDISTLISTR (FSUSERID, FSNODE, ERRCODE, NUMREC, DISTLIST_names DISTLIST_entries, BAD_FSUSERLIST_entries)

TABLE 5

VERB IDs

| Name | Verb ID |
| --- | --- |
| CALENDARQUERY | 03 |
| CALENDARQUERYR | 04 |
| CTHEADER | 05 |
| CTHEADERR | 06 |
| CVHEADER | 07 |
| CVHEADERR | 08 |
| DELETETEXT | 09 |
| DELETETEXTR | 10 |
| DELETEVOICE | 11 |
| DELETEVOICER | 12 |
| DIAL | 13 |
| DIALR | 14 |
| DTHEADER | 15 |
| DTHEADERR | 16 |
| DVHEADER | 17 |
| DVHEADERR | 18 |
| GETTEXT | 19 |
| GETTEXTR | 20 |
| LISTTEXT | 21 |
| LISTTEXTR | 22 |
| LISTVOICE | 23 |
| LISTVOICER | 24 |
| PLAY | 25 |
| PLAYR | 26 |
| PLAYCOMPLETE | 27 |
| PLAYCOMPLETER | 28 |
| QUERYTSTATUS | 29 |
| QUERYTSTATUSR | 30 |
| QUERYVSTATUS | 31 |
| QUERYVSTATUSR | 32 |
| RECORD | 33 |
| RECORDR | 34 |
| RECORDCOMPLETE | 35 |
| RECORDCOMPLETER | 36 |
| SAVEVOICE | 37 |
| SAVEVOICER | 38 |
| SENDTEXT | 39 |
| SENDTEXTR | 40 |
| SENDVOICE | 41 |
| SENDVOICER | 42 |
| SAVETEXT | 45 |
| SAVETEXTR | 46 |
| TSERVER | 47 |
| TSERVERR | 48 |
| TSTATUS | 49 |
| TSTATUSR | 50 |
| VDISTLIST | 59 |
| VDISTLISTR | 60 |
| VOICESENT | 61 |
| VOICESENTR | 62 |
| VSERVER | 63 |
| VSERVERR | 64 |
| VSTATUS | 65 |
| VSTATUSR | 66 |
| ENDPLAY | 67 |
| ENDPLAYR | 68 |
| ENDRECORD | 69 |
| ENDRECORDR | 70 |
| UPDATEVOICE | 71 |
| UPDATEVOICER | 72 |
| VDIRECTORY | 73 |
| VDIRECTORYR | 74 |
| TDISTLIST | 75 |
| TDISTLISTR | 76 |

TABLE 5-continued

VERB IDs

| Name | Verb ID |
| --- | --- |
| TDIRECTORY | 77 |
| TDIRECTCRYR | 78 |
| UPDATETEXT | 79 |
| UPDATETEXT | 80 |
| GETVOICE | 81 |
| GETVOICER | 82 |
| ACKCREATEV | 83 |
| ACKCREATEVR | 84 |
| ACKCREATET | 85 |
| ACKCREATETR | 86 |
| ACKUPDATEV | 87 |
| ACKUPDATEVR | 88 |
| ACKUPDATET | 89 |
| ACKUPDATETR | 90 |
| NEWVOICE | 91 |
| NEWVOICER | 92 |
| ACKCREATEI | 93 |
| ACKCREATEIR | 94 |
| ACKCREATEF | 95 |
| ACKCREATEFIR | 96 |
| ACKUPDATEI | 97 |
| ACKUPDATEIR | 98 |
| ACKUPDATEF | 99 |
| ACKUPDATEFR | 100 |
| CIHEADER | 101 |
| CIHEADERR | 102 |
| CFHEADER | 103 |
| CFHEADERR | 104 |
| DELETEIMAGE | 105 |
| DELETEIMAGER | 106 |
| DELETEFAX | 107 |
| DELETEFAXR | 108 |
| FAX | 109 |
| FAXR | 110 |
| LISTIMAGE | 111 |
| LISTIMAGER | 112 |
| LISTFAX | 113 |
| LISTFAXR | 114 |
| GETIMAGE | 115 |
| GETIMAGER | 116 |
| GETFAX | 117 |
| GETFAXR | 118 |
| IMAGE | 119 |
| IMAGER | 120 |
| FAX | 121 |
| FAXR | 122 |
| NEWIMAGE | 123 |
| NEWIMAGER | 124 |
| NEWFAX | 125 |
| NEWFAXR | 126 |
| QUERYISTATUS | 127 |
| QUERYISTATUSR | 128 |
| QUERYFSTATUS | 129 |
| QUERYFSTATUSR | 130 |
| RECORDIMAGE | 131 |
| RECORDIMAGER | 132 |
| RECORDFAX | 133 |
| RECORDFAXR | 134 |
| SAVEIMAGE | 135 |
| SAVEIMAGER | 136 |
| SAVEFAX | 137 |
| SAVEFAXR | 138 |
| SENDIMAGE | 139 |
| SENDIMAGER | 140 |

TABLE 5-continued

VERB IDs

| Name | Verb ID |
|---|---|
| SENDFAX | 141 |
| SENDFAXR | 142 |
| IDIRECTORY | 143 |
| IDIRECTORYR | 144 |
| FDIRECTORY | 145 |
| FDIRECTORYR | 146 |
| IDISTLIST | 147 |
| IDISTLISTR | 148 |
| FDISTLIST | 149 |
| FDISTLISTR | 150 |

TABLE 6

SAMPLE HEADER STRUCTURES

TSHEADER
Description: Office (text) system header information
  TSHEADER
    DATE
    TIME
    TSSEQUENCE
    TVMSGID
    TMSG
    DELIVERYFLAGS
    TSUSERID_sender
    TSNODE_sender
    TSNAME_sender
    TSMSGLENGTH
    DOCTYPE
    STATUS
    SENDTYPE
    PHONE
    SUBJECT
    NUM_RECIPS
    CCLIST
VSHEADER
Description: Voice system header information
  VSHEADER
    DATE
    TIME
    VSSEQUENCE
    TSSEQUENCE
    TVMSGID
    TMSG
    DELIVERYFLAGS
    VSUSERID_sender
    VSNODE_sender
    VSNAME_sender
    VSMSGLENGTH

TABLE 6-continued

SAMPLE HEADER STRUCTURES

VSMSGDURATION
    DOCTYPE
    STATUS
    SENDTYPE
    PHONE
    SUBJECT
    NUM_RECIPS
    CCLIST
ISHEADER
Description: Image system header information
  ISHEADER
    DATE
    TIME
    ISSEQUENCE
    TSSEQUECE
    TVMSGID
    TMSG
    DELIVERYFLAGS
    ISUSERID_sender
    ISNODE_sender
    ISNAME_sender
    ISMSGLENGTH
    DOCTYPE
    STATUS
    SENDTYPE
    PHONE
    SUBJECT
    NUM_RECIPS
    CCLIST
FSHEADER
Description: Facsimile system header information
  FSHEADER
    DATE
    TIME
    FSSEQUENCE
    TSSEQUENCE
    TVMSGID
    TMSG
    DELIVERYFLAGS
    FSUSERID_sender
    FSNODE_sender
    FSNAME_sender
    FSMSGLENGTH
    DOCTYPE
    STATUS
    SENDTYPE
    PHONE
    SUBJECT
    NUM_RECIPS
    CCLIST

TABLE 7

17/29 PARAMETER FIELDS

| NAME | FIELD ID | BYTES | DESCRIPTION |
|---|---|---|---|
| ACTION | 01 | 1 | Action between voice and Office systems. |
| ACTIONPARM | 02 | 1 | Directory action to be performed. |
| ARCHIVENAME | 03 | 18 | Chararacter string which contains the category name where a mail item is to be archived. |
| CALENDARITEM | 05 | 2 | Calendar item number. |
| CALLTOPHONE | | 30 | String of numbers indicating the telephone number to call. 18002827982 (left justified, blank filled) |
| DATE | 07 | 8 | YYYYMMDD where YYYY is the year, MM is the month, an DD is the day. Date submitted |
| DELIVERYDATE | 08 | 8 | YYYYMMDD where YYYY is the year, MM is the month, and DD is the day. |
| DELIVERYFLAGS | 09 | 1 | Message priority or classification: |
| DELIVERYTIME | 10 | 4 | Send option. HHMM for expected delivery time. Used for future delivery and personal reminders. |
| DIGITNAME | 12 | 20 | The digital representation of a name as entered on a telephone keypad. |
| DISTLISTNAME | 13 | 18 | Voice system distribution list |

TABLE 7-continued

| NAME | 17/29 PARAMETER FIELDS | | |
|---|---|---|---|
| | FIELD ID | BYTES | DESCRIPTION |
| | | | name. |
| DOCTYPE | 14 | 2 | Document type. |
| ERRCODE | 15 | 2 | Various errors. |
| FILTER | 16 | 2 | Filter to determine what headers should be sent on a refresh. Including type distribution (in-basket), acknowledgement, undelivered, archived, workspace. and greeting and attributes, opened, unopened, seen, not seen, priority, nonpriority, personal, and non-personal. |
| MAXBLOCKS | 17 | 2 | Maximum number of headers to be included in the response to a request to list the message headers; or directory entries to return when there is no unique match. |
| MAXSIZE | 18 | 2 | Maximum size of TEXT data to send to voice system in a command. When used wth OFFSET, the total TEXT is sent in pieces. |
| NUMREC | 19 | 10 | Number of records returned on a directory search, or created/deleted/updated in a directory transaction. |
| OFFSET | 21 | 1 | Offset from: beginning of the total TEXT for the part of TEXT in this command. |
| PHONE | 22 | 30 | Sender's telephone number (left justified, blank filled). |
| PLAYACTION | 23 | 1 | Indicates playback action, e.g., normal playback, skip backward, skip forward, speedup and slowdown. |
| PROFILEACTION | 24 | 1 | Indicates database action: L for user list, C for contents, U for user update (update not in phase 1). |
| RECORDTYPE | 25 | 1 | Signifies whether to record a new message or append to an old message. |
| REFRESHFLAG | 27 | 1 | The notification represents an existing header in the system or the notification represents a new header. "R" for existing; "N" for new. |
| SEARCHMAX | 29 | 1 | Maximum number of matches for which to return data. |
| SENDFLAG | 31 | 1 | Indcation of whether headers should be sent or not. If headers are not sent, the count could be checked for synchronization purposes. |
| SENDTYPE | 32 | 2 | Properties of the send request, new item, forward, reply, no acknowlegement, and acknowlegement requested. |
| SESSIONPHONE | 33 | 30 | String of numbers indicating the telephone number from which to call. |
| STARTTIME | 34 | 6 | HHMMSS where HH is hours, MM is minutes, and SS is seconds. Start time for search. |
| STATUS | 35 | 1 | Message status. |
| STOPTIME | 36 | 6 | Stop time for search. HHMMSS where HH is hours, MM is minutes, and SS is seconds. |
| SUBJECT | 37 | 50 | Subject of the note. |
| | 38 | 2 | Integer indicating the current number of text messages in the user's in-basket. This count does not include the voice headers. |
| TEXT | 39 | | Alphanumeric string for text note or calenar entry. |
| TIME | 40 | 6 | HHMMSS here HH is hours, MM is minute, and SS is seconds. Time submitted. |
| TMSG | 41 | 255 | Text messsage field used to contain text buckslips. |
| TSERRCODE | 42 | 2 | Used SENDVOICE, SENDTEXT, |

TABLE 7-continued

| NAME | 17/29 PARAMETER FIELDS FIELD ID | BYTES | DESCRIPTION |
|---|---|---|---|
| | | | VDISTLIST in the structure BAD_TSUSERLIST. Always non-zero. |
| TSMSGLENGTH | 43 | 4 | File length of text note. |
| TSNAME | 44 | 44 | A user's full name (e.g. Carla L. Dennis) by which the Office system knows the user. |
| TSNODE 45(s) | 145(1) | 8 | Office system node ID. |
| TSSEQUENCE | 46 | 53 | Text mail item sequence number. |
| TSUSERID | 47(s)147(1) | 8 | Office system user ID. |
| TVMSGID | 48 | 8 | Message ID of voice buckslip. |
| VCOUNT | 49 | 2 | Integer indicating th current number of voice messages in the user's in-basket. This count does not include the text headers. |
| VSMSGLENGTH | 50 | 4 | Length of voice message in bytes. |
| VSNAME | 51 | 44 | Voice system's user name. |
| VSNODE | 52 | 8 | Voice system node ID. |
| VSSEQUENCE | 53 | 8 | Voice system message sequence number. |
| VSUSERID | 54 | 8 | Voice system user ID. |
| VSERRCODE | 55 | 2 | Used by SENDVOICE, VDISTLIST in the structure BAD_VSUSERLISTR. Always non-zero. |
| TABLENAME | 56 | 18 | Name of Office Directory Table being searched or updated. |
| NUMFLDS (number of flds) | 57 | 2 | Numer of fields in a record, being passed in BUFFER. |
| COLNO | 58 | 2 | Index to an Office Directory field. |
| COLDATA | 60 | | Data associated with an Office Directory field |
| VSMSGDURATION | 61 | 2 | Length of voice message in seconds |
| ACKACTION | 62 | 2 | Define the action to be performed on ack/nack update. |
| USERACTION | 63 | 2 | User action between voice and Office systems. |
| NUM RECIPS | 64 | 2 | Numer of recipients in CCLIST. |
| DELETEFLAG | 64 | 1 | Message deletion indicator, e.g., do not delete or delete the message. |

While the invention has been described with reference to a preferred embodiment, it will be understood by those skilled in the art that various changes can be made to the architecture without departing from the spirit and scope of the invention. Accordingly, the invention shall be limited only as specified in the following claims.

We claim:

1. In a data processing network composed of a plurality of data processing systems coupled together by communication lines each of which comprising a processor and a memory, the memory containing at least one message server program dedicated to providing messaging services of a particular media type, a method for controlling delivery of messages of a plurality of media types to a recipient so that all messages regardless of media type are available to the recipient at a terminal associated with any of the data processing systems, the method comprising the steps of:

creating and storing a first message and a first message pointer of a first media type at a first message server program in the memory of a first data processing system;

creating and storing a second message and a second message pointer of a second media type at a second message server program in the memory of a second data processing system;

sending and storing a copy of the first message pointer to a first integrated mail basket for the recipient, the first integrated mail basket in the memory of the first data processing system;

sending and storing a copy of the second message pointer to. a second integrated mail basket for the recipient, the second integrated mail basket in the memory of the second data processing system;

sending and storing a copy of the first message pointer to the second integrated mail basket; sending and storing a copy of the second message pointer to the first integrated mail basket;

so that the first and second integrated mail baskets allow access to the first and second messages from a terminal associated with either data processing system.

2. The method as recited in claim 1 which further comprises the steps of:

creating and storing a third message and a third message pointer of a third media type at a third message server program in the memory of one of the plurality of data processing systems;

sending and storing a copy of the third message pointer to a third integrated mail basket for the recipient, the third integrated mail basket in the memory of the data processing system containing the third message server program;

sending and storing copies of the third message pointer to the first and second integrated mail baskets;

sending and storing copies of the first and second message pointers to the third integrated mail baskets;

so that the first, second and third integrated mail baskets allow access to the first, second and third messages from a terminal associated with any data processing system.

3. The method as recited in claim 2 which further comprises the steps of:
creating and storing a fourth message and a fourth message pointer of a fourth media type at a fourth message server program in the memory of one of the plurality of data processing systems;
sending and storing a copy of the fourth message pointer to a fourth integrated mail basket for the recipient, the fourth integrated mail basket in the memory of the data processing system containing the fourth message server program;
sending and storing copies of the fourth message pointer to the first, second and third integrated mail baskets;
sending and storing copies of the first, second and third message pointers to the fourth integrated mail basket;
so that the first, second, third and fourth integrated mail baskets allow access to the first, second, third and fourth messages from a terminal associated with any data processing system.

4. The method as recited in claim 1 which further comprises the step of checking each integrated mail basket to assure that each basket contains the identical message pointers.

5. The method as recited in claim 3 wherein the third and fourth message server programs are in the memories of a third and fourth data processing system respectively.

6. The method as recited in claim 1 which further comprises the steps of:
retrieving the second message from a terminal associated with the first data processing system; and
converting the second message from the second media type to the first media type.

7. The method as recited in claim 1 which further comprises the steps of:
requesting that a terminal associated with the second data processing system perform a messaging service, the requesting step originating at a terminal associated with the first data processing system; and,
performing the requested messaging service at the terminal associated with the second data processing system.

8. The method as recited in claim 1 which further comprises the steps of:
creating a third message of the second media type at a terminal associated with the first data processing system by requesting a messaging service from the second message server program;
storing the third message and a third message pointer at the second message server program;
sending and storing a copy of the third message pointer to the second integrated mail basket;
sending and storing a copy of the third message pointer to the first integrated mail basket;
so that the first and second integrated mail baskets allow access to the first, second and third messages from a terminal associated with either data processing system.

9. In a data processing network composed of a plurality of data processing systems each of which comprising a processor and a memory, the memory of at least one data processing system a plurality of message server programs each dedicated to provide messaging services of a particular media type, a method for controlling delivery of messages of a plurality of media types to a recipient so that all messages regardless of media type are available to the recipient at a terminal associated with any of the message servers, the method comprising the steps of:
creating and storing a first message and a first message pointer of a first media type at a first message server program;
creating and storing a second message and a second message pointer of a second media type at a second message server program;
sending and storing a copy of the first message pointer to a first integrated mail basket for the recipient, the first integrated mail basket accessed by the first message server program;
sending and storing a copy of the second message pointer to a second integrated mail basket for the recipient, the second integrated mail basket accessed by the second message server program;
sending and storing a copy of the first message pointer to the second integrated mail basket;
sending and storing a copy of the second message pointer to the first integrated mail basket;
so that the first and second integrated mail baskets allow access to the first and second messages from a terminal associated with either message server program.

10. The method as recited in claim 9 which further comprises the steps of:
creating and storing a third message and a third message pointer of a third media type at a third message server program;
sending and storing a copy of the third message pointer to a third integrated mail basket for the recipient, the third integrated mail basket accessed by the third message server program;
sending and storing copies of the third message pointer to the first and second integrated mail baskets;
sending and storing copies of the first and second message pointers to the third integrated mail basket;
so that the first, second and third integrated mail baskets allow access to the first, second and third messages from a terminal associated with any message server program.

11. The method as recited in claim 10 which further comprises the steps of:
creating and storing a fourth message and a fourth message pointer of a fourth media type at a fourth message server program;
sending and storing a copy of the fourth message pointer to a fourth integrated mail basket for the recipient, the fourth integrated mail basket accessed by the third message server program;
sending and storing a copy of the fourth message pointer to the first, second and third message server programs;
sending and storing copies of the first, second and third message pointers to the fourth message server programs;
so that the first, second, third and fourth integrated mail baskets allow access to the first, second, third and fourth messages from a terminal associated with any message server.

12. The method as recited in claim 9 which further comprises the step of checking the first and second integrated mail baskets to assure that each basket contains the identical message pointers.

13. The method as recited in claim 9 which further comprises the steps of:
retrieving the second message from a terminal associated with the first message server program;
converting the second message from the second media type to the first media type.

14. The method as recited in claim 9 which further comprises the steps of:
creating a third message of the second media type at a terminal associated with the first message server by requesting a messaging service from the second message server;
storing the third message and a third message pointer at the second message server;
sending and storing a copy of the third message pointer to the second integrated mail basket;
sending and storing a copy of the third message pointer to the first integrated mail basket;
so that the first and second integrated mail baskets allow access to the first, second and third messages from a terminal associated with either message server.

15. The method as recited in claim 9 which further comprises the steps of:
requesting that a terminal associated with the second data processing system perform a messaging service, the requesting step originating at a terminal associated with the first data processing system; and,
performing the requested messaging service at the terminal associated with the second data processing system.

16. A data processing network for controlling delivery of messages of a plurality of media types to a recipient comprising:
a first data processing system having a processor and a memory coupled to a network bus, the memory containing a first message server program for creating and storing a first message and a first message pointer of a first media type;
a terminal coupled to and associated with the first data processing system for accessing a message of the first media type;
a second data processing system having a processor and a memory coupled to the network bus, the memory containing a second message server for creating and storing a second message and a second message pointer of a second media type;
a terminal coupled to and associated with the second data processing system for accessing a message of the second media type;
the first and second message server programs respectively comprising first and second integrated mail baskets for storing message pointers for the recipient and respectively comprising first and second shadowing means for sending copies of message pointers to all integrated mail baskets in the network belonging to the recipient;
sending and synchronizing means coupled to the first and second message server programs for sending messages and message pointers and for synchronizing the recipients integrated mail baskets so that copies of the same message pointers are contained in each integrated mail basket;
so that the first and second integrated mail baskets allow access to the first and second messages from a terminal associated with either data processing system.

17. The network as recited in claim 16 which further comprises:
a third data processing system having a processor and a memory coupled to the network bus, the memory containing a third message server program for creating and storing a third message and a third message pointer of a third media type the third message server program comprising a third integrated mail basket for storing message pointers for the recipient and a third shadowing means for sending copies of message pointer to all integrated mail baskets in the network belonging to the recipient;
a terminal coupled to the third data processing system for accessing a message of the third media type;
sending and synchronizing means also coupled to the third message server program;
so that the first, second and third integrated mail baskets allow access to the first, second and third messages from a terminal associated with any data processing system.

18. The network as recited in claim 17 which further comprises:
a fourth data processing system having a processor and a memory coupled to the network bus, the memory containing a fourth message server program for creating and storing a fourth message and a fourth message pointer of a fourth media type the fourth message server program comprising a fourth integrated mail basket for storing message pointers for the recipient and a fourth shadowing means for sending copies of message pointer to all integrated mail baskets in the network belonging to the recipient;
a terminal coupled to the fourth data processing system for accessing a message of the fourth media type;
sending and synchronizing means also coupled to the fourth message server program;
so that the first, second, third and fourth integrated mail baskets allow access to the first, second, third and fourth messages from a terminal associated with any data processing system.

19. The network as recited in claim 16 which further comprises:
retrieving means for accessing the second message from a terminal associated with the first data processing system; and,
converting means for changing the second message from the second media type to the first media type.

20. The network as recited in claim 16 which further comprises:
requesting means for messaging services from the second message server program for creating a third message of the second media type at a terminal associated with the first data processing system.

21. The network as recited in claim 16 which further comprises:
requesting means for messaging services from the second messaging server program for a request which originates at a terminal coupled to the first data processing system and the messaging services are performed by a terminal coupled to the second data processing system.

22. A data processing system for inclusion in a data processing network for controlling delivery of messages of a plurality of media types to a recipient, the system comprising:

a processor coupled to a system bus;

a memory coupled to the system bus containing code modules which contain instructions control the creation, delivery and storage of messages and message pointers within the system and the network, the code modules comprising:

a first message server program for creating, delivering and storing a first message and a first message pointer of a first media type;

a first message store for storing messages of the first media type;

a first message pointer store for storing message pointers of a plurality of media types;

a plurality of integrated mail baskets in the first message pointer store, each integrated mail basket for storing message pointers of a particular recipient;

a media extension for handling message pointers of a second media type and for sending copies of message pointers of the first media type to a second plurality of integrated mail baskets in a second message store in the network;

an integrated messaging server program for delivering messages and message pointers between the first message server program and the network and for synchronizing a message pointer count between the first and second integrated mail baskets;

so that a terminal coupled to the system can access messages of a plurality of media types from the message pointers stored in the first message pointer store.

23. The system as recited in claim 22, wherein the code modules further comprise:

a second message server program for creating, delivering and storing a second message and a second message pointer of a second media type;

a second message store for storing messages of the second media type;

the second message pointer store for storing message pointers of a plurality of media types;

the second plurality of integrated mail baskets in the second message pointer store, each integrated mail basket for storing message pointers of a particular recipient;

a media extension for handling message pointers of the first media type and for sending copies of message pointers of the second media type to the first plurality of integrated mail baskets;

so that a second terminal coupled to the system can access messages of a plurality of media types from the message pointers stored in the second message pointer store.

24. The system as recited in claim 22, wherein the code modules further comprise:

retrieving means for accessing the second message from a terminal associated with the first data processing system; and, converting means for changing the second message from the second media type to the first media type.

25. The system as recited in claim 22 which further comprises:

requesting means for messaging services from the second message. server program for creating a third message of the second media type at a terminal associated with the first data processing system.

26. The system as recited in claim 22 which further comprises:

requesting means for messaging services from the second messaging server program for a request which originates at a terminal coupled to the first data processing system and the messaging services are performed by a terminal coupled to the second data processing system.

27. A data processing system for inclusion in a data processing network for controlling delivery of messages of a plurality of media types to a recipient, the system comprising:

a processor coupled to a system bus;

a memory coupled to the system bus containing code modules which contain instruction control the creation, delivery and storage of messages and message pointers within the system and the network;

a first message server program in the memory for creating, delivery and storing a first message and a first message pointer of a first media type;

a first message storage means for storing messages of the first media type;

a first message pointer storage means for storing message pointers of a plurality of media types, the first message pointer storage means containing a plurality of integrated mail baskets, each integrated mail basket for storing message pointers of a particular recipient;

a media extension for handling message pointers of a second media type and for sending copies of message pointers of the first media type to a second plurality of integrated mail baskets in a second message storage means in the network;

a sending and synchronizing means for delivering messages and message pointers between the first message server program and the network and for synchronizing a message pointer count between the first and second integrated mail baskets;

so that a terminal coupled to the system can access messages of a plurality of media types from the message pointers stored in the first message pointer storage means.

28. The system as recited in claim 27 wherein the code modules further comprise:

a second message server program in the memory for creating, delivering and storing a second message and a second message pointer of a second media type;

a second message storage means for storing messages of the second media type;

the second message pointer storage means for storing message pointers of a plurality of media types, the second message pointer storage means containing the second plurality of integrated mail baskets, each integrated mail basket for storing message pointers of a particular recipient;

a media extension for handling message pointers of the first media types and for sending copies of message pointers of the second media type to the first plurality of integrated mail baskets;

so that a second terminal coupled to the system can access messages of a plurality of media types from the message pointers stored in the second message pointer store.

29. The system as recited in claim 27, wherein the code modules further comprise:

retrieving means for accessing the second message from a terminal associated with the first data processing system; and, converting means for changing the second message from the second media type to the first media type.

30. The system as recited in claim 27 which further comprises:
requesting means for messaging services from the second message server program for creating a third message of the second media type at a terminal associated with the first data processing system.

31. The system as recited in claim 27 which further comprises:
requesting means for messaging services from the second messaging server program for a request which originates at a terminal coupled to the first data processing system and the messaging services are performed by a terminal coupled to the second data processing system.

32. A plurality of code modules for inclusion in a memory in a data processing network for controlling delivery of messages of a plurality of media types to a recipient, the code modules comprising:
a first message server program for creating, delivering and storing a first message and a first message pointer of a first media type;
a first message store for storing messages of the first media type;
a first message pointer store for storing message pointers of a plurality of media types;
a plurality of integrated mail baskets in the first message pointer store, each integrated mail basket for storing message pointers of a particular recipient;
a media extension for handling message pointers of a second media type and for sending copies of message pointers of the first media type to a second plurality of integrated mail baskets in a second message store in the network;
an integrated messaging server program for delivering messages and message pointers between the first message server program and the network and for synchronizing a message pointer count between the first and second integrated mail baskets;
so that a terminal coupled to the network can access messages of a plurality of media types from the message pointers stored in the first message pointer store.

33. The code modules as recited in claim 32, wherein the code modules further comprise:
a second message server program for creating, delivering and storing a second message and a second message pointer of a second media type;
a second message store for storing messages of the second media type;
the second message pointer store for storing message pointers of a plurality of media types;
the second plurality of integrated mail baskets in the second message pointer store, each integrated mail basket for storing message pointers of a particular recipient;
a media extension for handling message pointers of the first media type and for sending copies of message pointers of the second media type to the first plurality of integrated mail baskets;
so that a second terminal coupled to the system can access messages of a plurality of media types from the message pointers stored in the second message pointer store.

34. The system as recited in claim 32, wherein the code modules further comprise:
retrieving means for accessing the second message from a terminal associated with the first data processing system; and,
converting means for changing the second message from the second media type-to the first media type.

35. The code modules as recited in claim 32 which further comprises:
requesting means for messaging services from the second message server program for creating a third message of the second media type at a terminal associated with the first data processing system.

36. The code modules as recited in claim 32 which further comprises:
requesting means for messaging services from the second messaging server program for a request which originates at a terminal coupled to the first data processing system and the messaging services are performed by a terminal coupled to the second data processing system.

* * * * *